US010202302B2

(12) United States Patent
Goodwin et al.

(10) Patent No.: US 10,202,302 B2
(45) Date of Patent: *Feb. 12, 2019

(54) LITHIUM CONTAINING GLASS WITH HIGH AND LOW OXIDIZED IRON CONTENT, AND PRODUCTS USING SAME

(71) Applicant: PPG INDUSTRIES OHIO, INC., Cleveland, OH (US)

(72) Inventors: George B. Goodwin, Cranberry Township, PA (US); Mehran Arbab, Pittsburgh, PA (US); Caroline S. Harris, Pittsburgh, PA (US); Larry J. Shelestak, Bairdford, PA (US); Calvin B. Blevins, Huntsville, AL (US); James V. Hartmann, Huntsville, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 431 days.

This patent is subject to a terminal disclaimer.

(21) Appl. No.: 14/712,381

(22) Filed: May 14, 2015

(65) Prior Publication Data

US 2015/0246842 A1  Sep. 3, 2015

Related U.S. Application Data

(63) Continuation-in-part of application No. 13/768,030, filed on Feb. 15, 2013, now Pat. No. 9,658,437.
(Continued)

(51) Int. Cl.
*C03C 3/085* (2006.01)
*C03C 4/08* (2006.01)
(Continued)

(52) U.S. Cl.
CPC ........ *C03C 3/085* (2013.01); *B32B 17/10045* (2013.01); *B32B 17/10119* (2013.01);
(Continued)

(58) Field of Classification Search
CPC .............. B32B 17/06; B32B 17/10431; B32B 17/10449; C03C 3/083; C03C 3/095;
(Continued)

(56) References Cited

U.S. PATENT DOCUMENTS 3,762,902 A   10/1973   Wagner et al.
3,869,270 A    3/1975   Brungs et al.
(Continued)

FOREIGN PATENT DOCUMENTS

DE   102010013641 A1   10/2011
RU       2246454 C2    2/2005
(Continued)

OTHER PUBLICATIONS

PCT International Search Report, PCT/US2015/030943 dated Aug. 4, 2015.
(Continued)

*Primary Examiner* — Stephone B Allen
*Assistant Examiner* — Ryan S Dunning
(74) *Attorney, Agent, or Firm* — Julie W. Meder

(57) ABSTRACT

A low infrared absorbing lithium glass includes FeO in the range of 0.0005-0.015 wt. %, more preferably 0.001-0.010 wt. %, and a redox ratio in the range of 0.005-0.15, more preferably in the range of 0.005-0.10. The glass can be chemically tempered and used to provide a ballistic viewing cover for night vision goggles or scope. A method is provided to change a glass making process from making a high infrared absorbing lithium glass having FeO in the range of 0.02 to 0.04 wt. % and a redox ratio in the range of 0.2 to 0.4 to the low infrared absorbing lithium glass by adding additional oxidizers to the batch materials. A second method is provided to change a glass making process from making a low infrared absorbing lithium glass to the high infrared absorbing lithium glass by adding additional reduc-
(Continued)

ers to the batch material. In one embodiment of the invention the oxidizer is $CeO_2$. An embodiment of the invention covers a glass made according to the method.

15 Claims, 6 Drawing Sheets

Related U.S. Application Data

(60) Provisional application No. 61/602,909, filed on Feb. 24, 2012, provisional application No. 62/000,782, filed on May 20, 2014.

(51) Int. Cl.
| | |
|---|---|
| *B32B 17/10* | (2006.01) |
| *G02B 3/00* | (2006.01) |
| *C03C 3/095* | (2006.01) |
| *C03C 4/10* | (2006.01) |
| *C03B 5/173* | (2006.01) |
| *F41H 5/04* | (2006.01) |
| *G02B 13/14* | (2006.01) |
| *F41G 1/38* | (2006.01) |
| *C03C 4/00* | (2006.01) |
| *G02B 5/22* | (2006.01) |

(52) U.S. Cl.
CPC ........ *B32B 17/10137* (2013.01); *C03B 5/173* (2013.01); *C03C 3/095* (2013.01); *C03C 4/0085* (2013.01); *C03C 4/082* (2013.01); *C03C 4/10* (2013.01); *F41G 1/383* (2013.01); *F41H 5/0407* (2013.01); *G02B 3/00* (2013.01); *G02B 13/14* (2013.01); *B32B 2605/08* (2013.01); *B32B 2605/16* (2013.01); *B32B 2605/18* (2013.01); *G02B 5/226* (2013.01)

(58) Field of Classification Search
CPC .. C03C 4/02; C03C 4/08; C03C 4/082; C03C 4/085; C03C 4/10; C03C 21/002; F21V 9/04; G02B 5/226; G02F 2201/08; G02F 2201/083; G02F 2202/09; G02F 2203/055
USPC ........ 252/582, 584, 587; 359/350, 359, 577, 359/589; 428/426, 428, 441; 501/61, 68, 501/904, 905
See application file for complete search history.

(56) References Cited

U.S. PATENT DOCUMENTS

| | | | |
|---|---|---|---|
| 4,078,107 A | 3/1978 | Bitterice et al. | |
| 4,156,755 A | 5/1979 | Rinehart | |
| 4,610,771 A | 9/1986 | Gillery | |
| 4,623,389 A | 11/1986 | Donley et al. | |
| 4,792,536 A | 12/1988 | Pecoraro et al. | |
| 4,806,220 A | 2/1989 | Finley | |
| 4,902,875 A | 2/1990 | Koontz | |
| 5,006,144 A | 4/1991 | Knavish et al. | |
| 5,030,594 A | 7/1991 | Heithoff | |
| 5,344,798 A | 9/1994 | Morimoto et al. | |
| 5,469,657 A | 11/1995 | Drew | |
| 5,821,001 A | 10/1998 | Arbab et al. | |
| 5,851,940 A | 12/1998 | Boulos et al. | |
| 5,873,203 A | 2/1999 | Thiel | |
| 6,582,799 B1 | 6/2003 | Brown et al. | |
| 6,664,204 B1 | 12/2003 | Costin | |
| 6,962,887 B2 | 11/2005 | Heithoff | |
| 7,482,294 B2 | 1/2009 | Landa et al. | |
| 7,727,917 B2 | 6/2010 | Shelestak et al. | |
| 7,871,703 B2 | 1/2011 | Shelestak et al. | |
| 8,304,358 B2 | 11/2012 | Shelestak et al. | |
| 8,981,265 B2 | 3/2015 | Jiao et al. | |
| 9,658,437 B2 * | 5/2017 | Goodwin | C03B 5/173 |
| 2003/0015648 A1 | 1/2003 | Janeczko et al. | |
| 2004/0121896 A1 | 6/2004 | Landa et al. | |
| 2007/0213196 A1 | 9/2007 | Jones et al. | |
| 2008/0214380 A1 | 9/2008 | Abensour et al. | |
| 2009/0109654 A1 * | 4/2009 | Fechner | C03C 3/068 362/97.1 |
| 2009/0205711 A1 | 8/2009 | Polcyn | |
| 2010/0126218 A1 | 5/2010 | Shelestak et al. | |
| 2010/0252787 A1 | 10/2010 | Jones | |
| 2010/0304949 A1 | 12/2010 | Sachot et al. | |
| 2012/0058880 A1 | 3/2012 | Shelestak | |
| 2013/0075531 A1 | 3/2013 | Jiao et al. | |
| 2013/0186140 A1 | 7/2013 | Brix et al. | |
| 2013/0189486 A1 | 7/2013 | Wang et al. | |
| 2013/0199360 A1 | 8/2013 | Schaupert et al. | |
| 2014/0029088 A1 | 1/2014 | Goodwin et al. | |
| 2017/0227743 A1 * | 8/2017 | Goodwin | G02B 13/14 |

FOREIGN PATENT DOCUMENTS

| | | |
|---|---|---|
| WO | 2011103799 A1 | 9/2011 |
| WO | 2013/126282 A1 | 8/2013 |

OTHER PUBLICATIONS

Trier W. Ed—Trier W: "Glass Furnaces, Design Construction and Operation; Passage", Jan. 1, 1984, Glass Furnaces: Design, Construction and Operation. Translation of Glasschmelzofen: Konstruktion Und Betriebsverhalten, Springer Verlag 1984, Sheffield, Soc. of Glass Technology, GB, pp. 164-169. XP002030682.

PCT Search Report, International Application No. PCT/US2013/026344, dated Jun. 27, 2013.

* cited by examiner

LITHIUM CONTAINING GLASS WITH HIGH AND LOW OXIDIZED IRON CONTENT, AND PRODUCTS USING SAME

CROSS-REFERENCE TO RELATED APPLICATIONS

This application is a continuation-in-part application of U.S. patent application Ser. No. 13/768,030 filed on Feb. 15, 2013 and titled "LITHIUM CONTAINING GLASS WITH HIGH OXIDIZED IRON CONTENT AND METHOD OF MAKING SAME". This application claims the benefits of U.S. Provisional Patent Application Ser. No. 61/602,909 filed Feb. 24, 2012 and titled "LITHIUM CONTAINING GLASS WITH HIGH OXIDIZED IRON CONTENT AND METHOD OF MAKING SAME", and of U.S. Provisional Patent Application Ser. No. 62/000,782 filed May 20, 2014 and titled "AIRCRAFT WINDSHIELD". Application Ser. Nos. 61/602,909, 62/000,782 and Ser. No. 13/768,030 in their entirety are incorporated herein by reference.

BACKGROUND OF THE INVENTION

Field of the Invention

This invention relates to glasses having a low or high oxidized iron content, to methods of making such glasses, and to articles made using such glasses, and more particularly, the invention relates to a lithium aluminosilicate glass having a high or low infrared transmission, a method of changing from a Campaign making high infrared absorbing glasses, i.e., a glass having high reduced iron content, to a Campaign making a low infrared absorbing glass, i.e., a glass having low reduced iron content, and vice versa, and articles, e.g. automotive and/or aircraft transparencies made using such glasses.

Discussion of the Technology

Of particular interest in the following discussion is the manufacture of lithium containing glasses. As is appreciated by those skilled in the art, ion exchanged strengthened glass is frequently made using lithium containing glasses. One type of lithium containing glass is disclosed in U.S. Pat. No. 4,156,755 ("hereinafter also referred to as "USPN '755"), which patent in its entirety is incorporated herein by reference. The glass of USPN '755 is also referred to as a "lithium aluminosilicate glass" as that reference covers the three components of the glass, namely lithium, aluminum and silica that are most characteristic to the glass.

In general, iron is not a required ingredient to make lithium aluminosilicate glass for the ion exchange process, however, small amounts of iron are usually present in the lithium aluminosilicate glass as an impurity in the glass batch ingredients. At the present time, the management of iron oxide in the lithium containing glass batch materials to alter the optical and/or color properties of the lithium containing glass is of present interest. By way of background interest, total iron oxide content as $Fe_2O_3$ in commercial glasses depends on the product requirements, but are commonly in the range of 50-1200 parts per million (hereinafter also referred to as "PPM") or 0.005-0.12% of the total by weight (hereinafter referred to as "percent by weight" or "wt. %") for what are considered clear glass compositions. More particularly, the addition of iron to the glass composition can be made as ferrous iron (FeO) or as ferric iron ($Fe_2O_3$). During the melting of the glass batch materials, equilibrium is reached between the ferric form of iron ($Fe^{+++}$) and the ferrous form of iron ($Fe^{++}$) with about 25-30 wt. % of the iron in the ferrous form ($Fe^{++}$) and 70-75 wt. % of the iron in the ferric form ($Fe^{+++}$). The ferric oxide, $Fe_2O_3$, is a strong ultraviolet radiation absorber and operates as a yellow colorant in the glass, and the ferrous oxide, FeO, is a strong infrared radiation absorber and operates as a blue colorant in the glass.

In the instance when a glass sheet, for example but not limiting to the discussion, a lithium aluminosilicate glass sheet (hereinafter also referred to as a "lithium glass sheet") is to be heated, e.g. but not limiting to the discussion, prior to bending and/or shaping, the composition of the lithium glass sheet preferably includes ferrous oxide (FeO) in the range of 0.02 to 0.04 wt. % (200 to 400 PPM), ferric oxide ($Fe_2O_3$) in the range of 0.05 to 0.10 wt. % (500 to 1000 PPM), and a redox ratio (discussed in detail below) in the range of 0.2 to 0.4. In the instance when a lithium glass sheet is to be used in the practice of the invention as a viewing window for infrared equipment, e.g. but not limited to, infrared night goggles, or as components of transparent armor or aerospace windows, the composition of the lithium glass sheet preferably includes ferrous oxide (FeO) preferably in the range of 0.001 to 0.005 wt. % (10-50 PPM), ferric oxide ($Fe_2O_3$) in the range of 0.010 to 0.05 wt. % (100-500 PPM), and the lithium glass has a preferred redox ratio in the range of 0.005 to 0.10. As noted from the above discussion, the wt. % of ferrous oxide is higher and the ferric oxide is lower for the lithium glass sheet to be heated to increase the absorption of the infrared wavelengths to decrease the heating time of the lithium glass sheet to reach the bending temperatures, and the wt. % of the ferrous oxide is lower and the ferric oxide is higher for the lithium glass sheet to be used for a viewing window for infrared equipment to increase the percent transmittance of infrared energy through the viewing window.

Consider now the drawbacks of going from a Campaign making a high infrared absorbing (hereinafter also referred to as "HIRA") lithium glass sheet to a Campaign making low infrared absorbing (hereinafter also referred to as "LIRA") lithium glass sheet, and/or going from a Campaign making a LIRA lithium glass sheet to a Campaign making HIRA lithium glass sheet. As can now be appreciated by one skilled in the art one drawback is the quantity of glass produced during the period starting at the end of one Campaign, e.g. the end of the Campaign to make HIRA lithium glass sheet, and ending at the start of the next Campaign, e.g. the start of the Campaign to make LIRA lithium glass sheet. The glass that is out of specifications for use as LIRA lithium glass sheet and HIRA lithium glass sheet is usually scrapped or used as cullet. It can now be appreciated by those skilled in the art that discarding the glass made during the change from one Campaign to another Campaign is costly due to the relatively high batch cost for lithium glass and to the time wasted making unusable glass or glass of marginal quality.

It is advantageous, therefore, to provide a method of minimizing or eliminating the drawbacks associated with changing from a Campaign making useable HIRA lithium glass sheet, or useable LIRA lithium glass sheet to a Campaign making useable LIRA lithium glass sheet, or useable HIRA lithium glass sheet, respectively.

SUMMARY OF THE INVENTION

One non-limiting embodiment of the invention relates to a glass composition including, among other things, a glass composition comprising:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. % |
| FeO | 0.0005-0.015 wt. % |
| $Fe_2O_3$ (total iron) | 50-less than 800 ppm; | and an oxidizer selected from the group of cerium oxide in the range of greater than 0 to 0.50 wt. %, manganese oxide in the range of greater than 0 to 0.75 wt. % and mixtures thereof, and a redox ratio in the range of 0.005-0.15.

Another non limiting embodiment of the invention relates to a glass composition including, among other things, a glass composition comprising:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. % |
| FeO | 0.0005-0.015 wt. % |
| $Fe_2O_3$ (total iron) | 800-1200 ppm; | and a redox ratio in the range of 0.006 to 0.13.

Further the invention relates to a device for viewing radiated infrared energy, the device comprising a housing having at least one passageway, the passageway having a first open end and a second open end, a lens system for viewing radiated infrared energy, the improvement comprising:

a chemically tempered ballistic glass lens mounted adjacent to one end of the passageway, the ballistic glass lens comprising a first surface, an opposite second surface and a glass segment between the first and the second surfaces of the ballistic glass lens, the glass segment comprising:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. % |
| FeO | 0.0005-0.015 wt. % |
| $Fe_2O_3$ (total iron) | 50-less than 800 ppm; | and an oxidizer selected from the group of cerium oxide in the range of greater than 0 to 0.50 wt. %, manganese oxide in the range of greater than 0 to 0.75 wt. % and mixtures thereof, and a redox ratio in the range of 0.005-0.15.

Still further, a non-limiting embodiment of the invention relates to a laminated transparency, e.g. an aircraft and land vehicle windshield comprising, among other things, a plurality of chemically strengthened glass sheets and optionally plastic sheets laminated together by plastic interlayers, wherein at least one of the glass sheets has a glass composition including, among other things:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. %; | and one or more selections from one of Group A and B, wherein Group A comprises:

| | |
| --- | --- |
| FeO | 0.0005-0.015 wt. % |
| $Fe_2O_3$ (total iron) | 50-less than 800 ppm; | and an oxidizer selected from the group of cerium oxide in the range of greater than 0 to 0.50 wt. %, manganese oxide in the range of greater than 0 to 0.75 wt. % and mixtures thereof, and a redox ratio in the range of 0.005-0.15; and Group B:

| | |
| --- | --- |
| FeO | 0.02-0.05 wt. % |
| $Fe_2O_3$ (total iron) | 800-1200 ppm; |
| a redox ratio | 0.20-0.40. |

DESCRIPTION OF THE INVENTION

Figure 1:
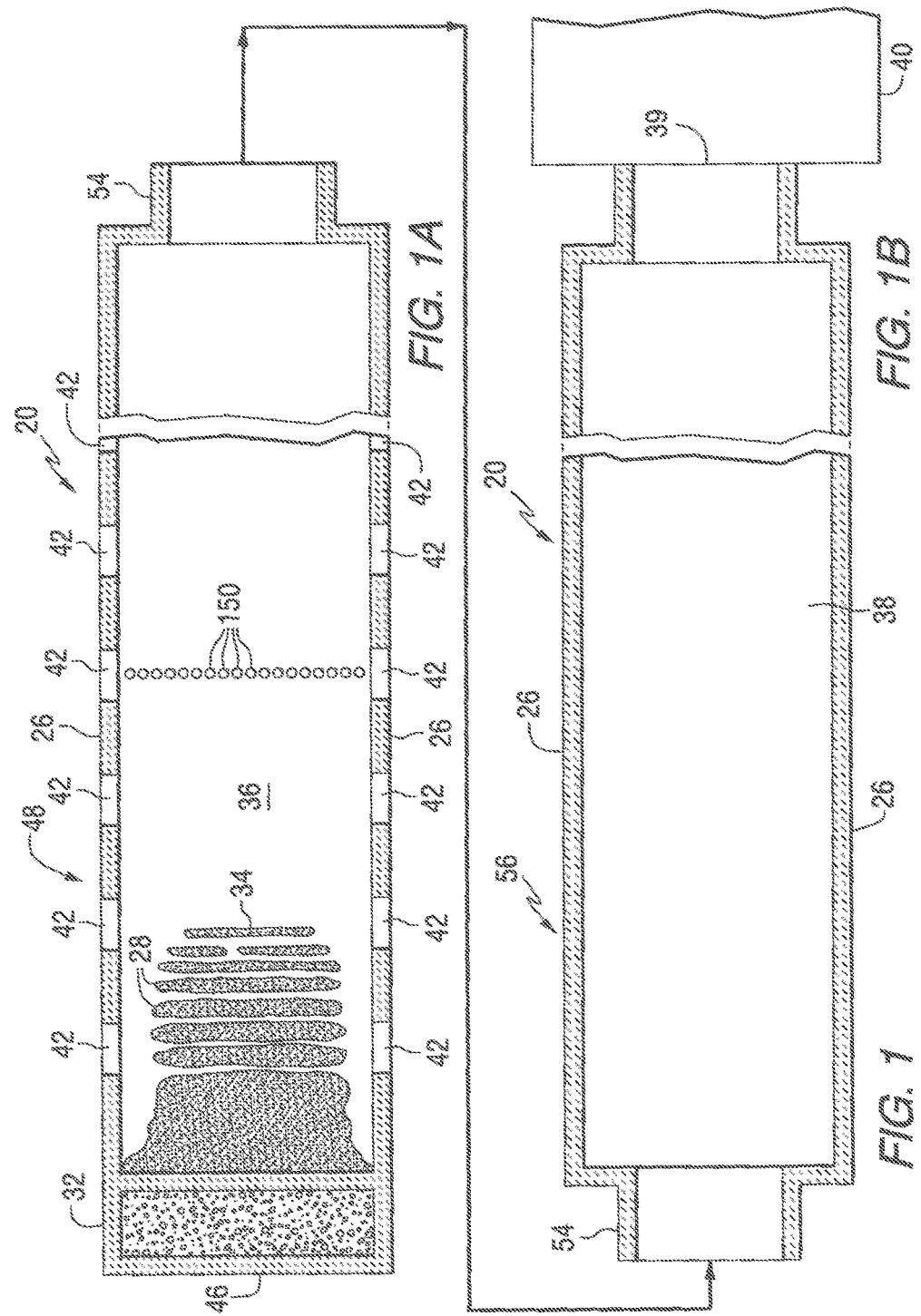
FIGS. 1A and 1B are plane views in cross section of a glass-melting furnace connected to a glass-forming chamber of the type used to make a float glass ribbon in accordance to the teachings of the invention.

As used herein, spatial or directional terms such as "inner", "outer", "left", "right", "up", "down", "horizontal", "vertical", and the like, relate to the invention as it is shown in the drawing on the figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing several non-limiting aspects of the invention, it is understood that the invention is not limited in its application to the details of the particular non-limiting aspects of the invention shown and discussed herein since the invention is capable of other embodiments. Further, the terminology used herein to discuss the invention is for the purpose of description and is not of limitation. Still further, unless indicated otherwise, in the following discussion like numbers refer to like elements, and any reference to composition amounts, such as "by weight percent", "wt. %" or "wt. %", "parts per million" and "ppm" are based on the total weight of the final glass composition, or the total weight of the mixed ingredients as oxides, e.g. but not limited to the glass batch materials after the conversion of oxide hydrates or carbonates to the oxide form is complete, whichever the case may be.

Non-Limiting Glass Compositions of the Invention

The non-limiting aspects of the invention are practiced to make, but are not limited to make a lithium aluminosilicate glass, or lithium glass, sheets or compositions of the types similar to, but not limited to, the glass sheets and/or compositions disclosed in USPN '755 containing amounts of Ferric iron oxide ($Fe_2O_3$) and/or Ferrous iron oxide (FeO) to enhance a property and/or color of the glass. The total amount of iron present in the lithium glass disclosed herein is expressed in terms of $Fe_2O_3$ in accordance with standard analytical practice but that does not imply that all of the iron is actually in the form of $Fe_2O_3$. Likewise, the amount of iron in the ferrous state ($Fe^{++}$) is reported as FeO even though it may not actually be present in the glass as FeO. In order to reflect the relative amounts of ferrous and ferric iron in the glass compositions disclosed herein, the term "redox ratio" shall be used. As used herein redox ratio shall mean the amount of iron in the ferrous state expressed as FeO divided by the total amount of iron expressed as $Fe_2O_3$. As can be appreciated, FeO equals the redox ratio times the total iron (expressed as $Fe_2O_3$), and total iron (expressed as $Fe_2O_3$) equals FeO divided by the redox ratio.

The ranges of materials or ingredients of the lithium glass disclosed in USPN '755 are listed in Table 1.

TABLE 1

| Component | Range | Preferred Range |
|---|---|---|
| $SiO_2$ | 59-63 wt. % | 60-63 wt. % |
| $Na_2O$ | 10-13 wt. % | 10-12 wt. % |
| $Li_2O$ | 4-5.5 wt. % | 4-5.5 wt. % |

TABLE 1-continued

| Component | Range | Preferred Range |
|---|---|---|
| $Al_2O_3$ | 15-23 wt. % | 17-19 wt. % |
| $ZrO_2$ | 2-5 wt. % | 3.5-5 wt. % |
| ($Al_2O_3$ + $ZrO_2$) | 19-25 wt. % | 21.5-24 wt. % |

The weight percent of all the oxides in the glass except for lithium are measured using X-Ray Fluorescence Spectroscopy (also known as "XRFS"). The weight percent of lithium oxide in the glass is measured by atomic absorption.

Further, as disclosed in USPN '755 minor or tramp quantities of other glass forming materials and glass modifiers or colorants, e.g. MgO, MnO, $TiO_2$, $Sb_2O_3$, $As_2O_3$, $K_2O$, PbO, $SO_3$, colorants, and mixtures thereof can be included. Minor or tramp quantities are amounts equal to or less than 2 weight percent ("% wt."), preferably less than 1.5 wt. %, and most preferably less than 1.00 wt. %. Minor amounts of colorants such as $Fe_2O_3$ may be included. As is appreciated by those skilled in the art, $Sb_2O_3$ and $As_2O_3$ are oxidizers for the glass sheet drawing process, but are not compatible for use in the float glass process because the reducing conditions of the float glass chamber reduces the $Sb_2O_3$ and $As_2O_3$ to antimony and arsenic metals, respectively. An apparatus commonly used to practice the float glass process is shown in FIGS. 1A, 1B and 2, and discussed in more detail below.

In one non-limiting aspect of the invention, when the lithium glass sheet having the composition of Table 1 is to be heated, e.g. but not limiting to the discussion, prior to bending and/or shaping of the lithium glass sheet, the lithium glass composition preferably, but not limiting to the invention, contains the ingredients of Table 1 plus the addition of ferrous oxide (FeO) in the range of 0.02 to 0.05 wt. % (200-500 ppm), also in the ranges of 0.02 to 0.035 wt. % (200 to 350 ppm), and of 0.035 to 0.040 wt. % (350 to 400 ppm), and preferably in the range of 0.03 to 0.038 wt. % (300 to 380 ppm), ferric oxide ($Fe_2O_3$) in the range of 0.0800 to 0.1200 wt. % (800-1200 ppm) and 0.05 to 0.12% (500-1200 ppm); also in the range of 0.06 to 0.10% (600 to 1000 PPM) and a redox ratio in the range of 0.2 to 0.4 and preferably in the range of 0.2 to 0.35. For purposes of clarity, lithium glasses, e.g. but not limited to the lithium glass of Table 1 having FeO in the range of 0.02 to 0.05 wt. % (200-500 ppm) and any of the subranges for FeO disclosed above, and having $Fe_2O_3$ in the range of 0.05-0.12% (500-1200 ppm) and the subranges for $Fe_2O_3$ disclosed above, and a redox ratio in the range of 0.2-0.4 and any subranges of the redox ratio disclosed above are hereinafter also referred to as a "high infrared absorbing lithium aluminosilicate glass" or "HIRA lithium aluminosilicate glass", or a "HIRA lithium glass").

During the Campaign to make the HIRA lithium glass, additions of sulfates and carbon are made to the glass batch ingredients to increase the ferrous iron (Fe++) content to maintain the molten glass within the desired redox ratio range and the total iron range.

In another non-limiting embodiment of the invention, the lithium glass, e.g. but not limited to the lithium glasses having the composition of the glasses of Table 1 is used as a viewing window for infrared equipment, e.g. but not limited to infrared night goggles, scopes, e.g. rifle scopes. The lithium glass composition is essentially free of iron to eliminate FeO in the glass to reduce, if not eliminate, infrared absorption by the glass. As discussed above, oxides of iron are not listed as a component of the lithium glass of Table 1; however, as is appreciated by those skilled in the art, it is expected that oxides of iron, e.g. ferrous iron will be present in the glass as a tramp material found in the batch materials, e.g. glass cullet. As can now be appreciated making a glass essentially free of iron to eliminate FeO in the glass is expensive. However, in one aspect of the invention, a controlled amount of iron and oxidizers are added to the batch to reduce and/or maintain the low amounts of FeO and/or to increase and/or maintain the high amount of ferric oxide ($Fe_2O_3$). In one non-limiting aspect of the invention ferric oxide ($Fe_2O_3$) and oxidizers are added to the ingredients of Table 1. To the extent ferrous iron can be present, the invention contemplates that the glass of the invention will include the composition of Table 1 plus ferrous oxide (FeO) in the range of 0.0005 to 0.015 wt. % (5-150 ppm), and preferably in the range of 0.001 to 0.010 wt. % (10-100 ppm), and ferric oxide in the range of 0.005 to less than 0.08 wt. % (50 to 800 ppm); in the range of 0.005 to 0.06 wt. % (50 to 600 ppm), preferably in the range of 0.005 to 0.03 wt. % (50 to 300 PPM) and a redox ratio in the range of 0.005 to 0.15 and preferably in the range of 0.005 to 0.10.

For purposes of clarity, lithium glasses, e.g. but not limited to the lithium glass of Table 1 having FeO in the range of 0.0005 to 0.015 wt. % (5-150 ppm), and any of the subranges for FeO disclosed above, having $Fe_2O_3$ in the range of 0.005 to 0.08 wt. % (50 to 800 PPM) and preferably in the subranges disclosed above, and having a redox ratio in the range of 0.005-0.15 and any subranges of the redox ratio disclosed above are hereinafter also referred to as a "low infrared absorbing lithium aluminosilicate glass", or "LIRA lithium aluminosilicate glass or "LIRA lithium glass". It is expected that the total iron ($Fe_2O_3$) will be in the range of 50-800 ppm, 50 to 500 ppm, 50-400 ppm, 50-300 ppm, 50-200 ppm, and 50-100 ppm. During the Campaign to make the LIRA lithium glass it was expected that additions of oxidizers compatible with the selected glass making processes would be added to the glass to oxidize the FeO to $Fe_2O_3$ to maintain the redox ratio in the desired range of 0.005 to 0.15.

Candidates for oxidizers identified cerium oxide, manganese oxide, antimony oxide, arsenic oxide and combinations thereof. Antimony oxide and arsenic oxide are of no interest in the present discussion because the glass making process (discussed in detail below) is not compatible with melting batch material having antimony oxide and arsenic oxide and moving the melted glass on a metal tin bath through a furnace having a hydrogen atmosphere. The two available oxidizers cerium oxide and manganese oxide were evaluated to determine their use with the lithium glass, e.g. but not limited to the lithium glass of Table 1 having iron to maintain the molten glass within the redox ratio range and the ferric oxide ($Fe_2O_3$) range for a LIRA lithium glass, and to determine if the lithium glass having expected impurities such as those discussed above, and cerium and manganese oxides in appropriate concentrations produce glasses with an acceptable Liquidus temperature.

More particularly, laboratory samples of the glass shown in Table 2 were made and Include "Control Sample", which is a glass sample without additions of cerium and/or manganese oxides; "Cerium Samples", which are glass samples with additions of $CeO_2$ stated in Table 2; and "Manganese Samples", which are glass samples with additions of $MnO_2$ stated in Table 2. Samples 1-5 are the Cerium Samples having varying amounts of cerium oxide, and Samples 6 and 7 are the Manganese Samples having varying amounts of manganese oxide.

TABLE 2

| High Iron Oxide (~0.09 wt. %) with Cerium and Manganese Oxides. | | | | | | | | |
|---|---|---|---|---|---|---|---|---|
|  | Control | 1 | 2 | 3 | 4 | 5 | 6 | 7 |
| Redox Control Agent | | | | | | | | |
| $CeO_2$ (wt. %) |  | 0.17 | 0.24 | 0.27 | 0.38 | 0.44 | | |
| MnO (wt. %) | | | | | | | 0.16 | 0.32 |
| Redox | 0.189 | 0.083 | 0.044 | 0.020 | 0.010 | 0.007 | 0.132 | 0.072 |
| FeO (wt. %) | 0.017 | 0.007 | 0.004 | 0.002 | 0.001 | 0.001 | 0.012 | 0.007 |
| Transmission Data (%) | | | | | | | | |
| LTC, 2° | 89.93 | 90.4 | 90.76 | 90.78 | 88.58 | 90.84 | 89.51 | 89.66 |
| UV (295-395 nm) | 73.88 | 62.09 | 59.7 | 57.26 | 52.51 | 51.45 | 69.35 | 65.46 |
| IR (775-2125 nm) | 78.83 | 86.07 | 88.69 | 90.49 | 91.17 | 91.39 | 82.48 | 86.6 |
| TSET (275-2125 nm) | 83.83 | 87.32 | 88.71 | 89.54 | 89.68 | 89.82 | 85.3 | 87.3 |

Spectral data was also collected for the glasses in Table 2 above. The data were recalculated to 0.223 Inch glass thickness and the ultraviolet light portion of the spectrum has been corrected for the wavelengths between 300 and 375 nanometers ("nm"), inclusive, for fluorescence of cerium in the glass. The correction was accomplished by measuring the specular excluded (diffuse) transmittance, then subtracting the diffuse component from the total transmittance for the wavelengths that exhibited an obvious diffuse component associated with the cerium fluorescence. This method may not account for all of the cerium fluorescence, but is considered to be more realistic than the data with all of the fluorescence included. This method is also used for all cerium oxide-containing melts discussed herein.

Figure 3:
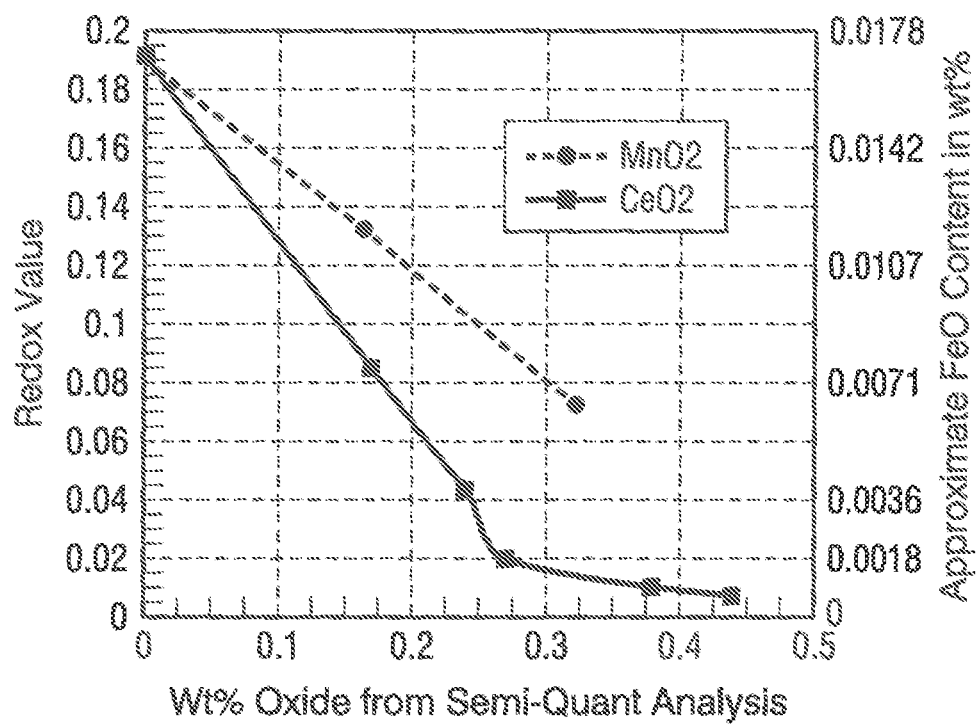
FIG. 3 is a graph showing the redox value and approximate ferrous iron (FeO) content as a result of the oxidation of FeO by different amounts of $CeO_2$ and $MnO_2$.
Figure 4:
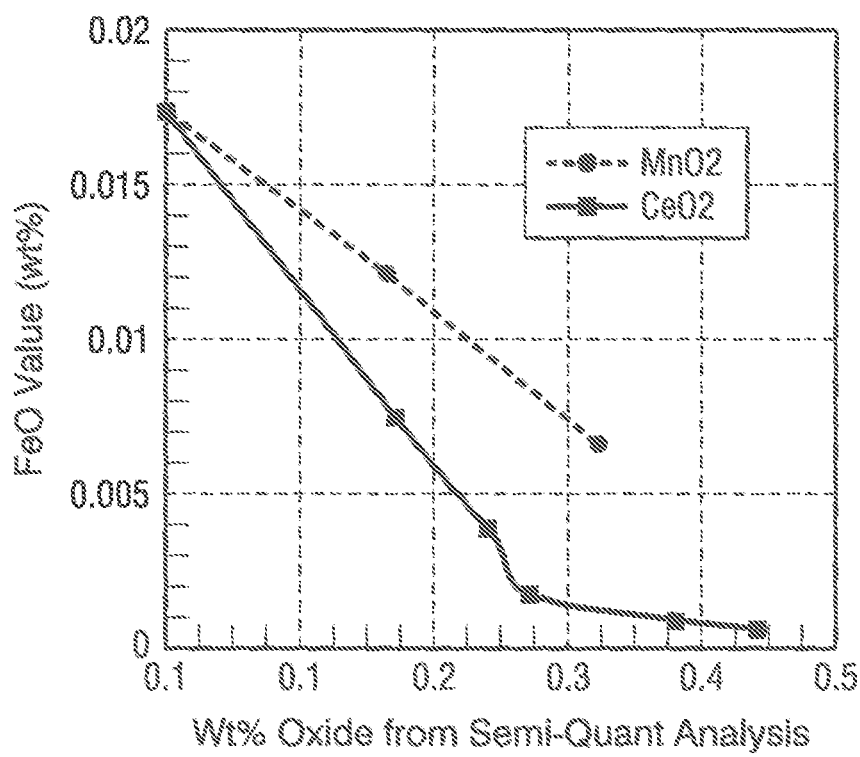
FIG. 4 is a graph showing the decrease in concentration of ferrous iron (FeO) by different amounts of $CeO_2$ and $MnO_2$. The increase in ferric oxide content is not shown.

FIG. 3 is a plot showing the redox ratio and approximate FeO content, and FIG. 4 is a plot showing the ferrous oxide content, of the Control Sample and the Samples 1-7 on the ordinate (y axis) and the wt. % of the cerium oxide and manganese oxide on the abscissa (x axis). The control sample data point is on the y axis. In the preferred practice of the invention, cerium oxide is used to oxidize the ferrous iron to the ferric iron because as shown in FIGS. 3 and 4 the cerium oxide is a more effective oxidizer than manganese oxide, and the cerium oxide "decolorizes" the glass. More particularly, cerium oxide is not a colorant in glass, but cerium oxide is a powerful oxidizing agent in glass, and its function in decolorized glass is to oxidize the iron in the ferrous state (Fe++) to iron in the ferric (Fe+++) state. Although cerium oxide is useful to decolorize the remaining traces of ferrous iron in the glass, the use of cerium oxide has limitations, e.g. but not limiting to the discussion, exposing the LIRA lithium glass to the sun has a solarizing effect on the glass, which results from the photo-oxidation of Ce+++ to Ce++++ and the photo-reduction of Fe+++ to Fe++. As is appreciated by those skilled in the art, the solarization effect of cerium and the photo-reduction of Fe+++ to Fe++ increases the light absorption of the glass in the visible and the IR ranges of the electromagnetic spectrum, which reduces light transmission in those ranges. Because the reduction in visible and infrared transmission is less than 1% with solarization when total iron oxide is at a low level such as less than 0.03 wt. %, cerium oxide is preferred to oxidize the ferrous iron. Nevertheless, the Invention contemplates adding manganese oxide instead of cerium oxide and adding mixtures of manganese oxide and cerium oxide.

The following glasses in Table 3 were prepared at very low total iron oxide levels with cerium oxide contents from 0.50 wt. % down to 0 wt. %. The data includes the calculated batch data after the batch has lost water and carbon dioxide as a result of the glassmaking process, the data for the three glasses that were analyzed for composition, viscosity data, liquidus data, and spectral data.

TABLE 3

Low iron glasses with a 0 to 0.50 wt. % range of cerium oxide content.

| | | 8 | 9 | 10 | 11 | 12 | 13 |
|---|---|---|---|---|---|---|---|
| Batch Composition (wt. %) | $SiO_2$ | 61.33 | 61.52 | 61.42 | 61.46 | 61.49 | 61.52 |
| | $Al_2O_3$ | 17.79 | 17.85 | 18.11 | 18.12 | 18.13 | 18.14 |
| | $Li_2O$ | 5.20 | 5.20 | 5.22 | 5.22 | 5.23 | 5.23 |
| | $Na_2O$ | 10.88 | 10.88 | 10.85 | 10.85 | 10.86 | 10.87 |
| | $Fe_2O_3$ | 0.0109 | 0.0110 | 0.0109 | 0.0109 | 0.0110 | 0.0110 |
| | $ZrO_2$ | 4.05 | 4.05 | 4.05 | 4.05 | 4.05 | 4.05 |
| | $SO_3$ | 0.080 | 0.080 | 0.080 | 0.080 | 0.080 | 0.080 |
| | CaO | 0.080 | 0.080 | 0.047 | 0.047 | 0.047 | 0.047 |
| | $K_2O$ | 0.038 | 0.038 | 0.038 | 0.038 | 0.038 | 0.038 |
| | MgO | 0.020 | 0.020 | 0.005 | 0.005 | 0.005 | 0.005 |
| | $TiO_2$ | 0.019 | 0.019 | 0.019 | 0.019 | 0.019 | 0.019 |
| | $CeO_2$ | 0.50 | 0.25 | 0.15 | 0.10 | 0.05 | 0 |
| | Sum | 100.000 | 100.000 | 100.000 | 100.000 | 100.000 | 100.000 |
| Analyzed Composition (wt. %) | $SiO_2$ | | | | 60.45 | 61.43 | 61.25 |
| | $Al_2O_3$ | | | | 17.23 | 17.71 | 17.87 |
| | $Li_2O$* | | | | 5.22 | 5.23 | 5.23 |
| | $Na_2O$ | | | | 11.05 | 11.36 | 11.29 |
| | $Fe_2O_3$ | | | | 0.013 | 0.013 | 0.007 |
| | $ZrO_2$ | | | | 3.98 | 4.03 | 4.08 |
| | $SO_3$ | | | | 0.10 | 0.06 | 0.09 |
| | CaO | | | | 0.09 | 0.08 | 0.10 |
| | $K_2O$ | | | | 0.03 | 0.04 | 0.04 |
| | MgO | | | | 0.04 | 0.03 | 0.04 |
| | $TiO_2$ | | | | 0.018 | 0.016 | 0.015 |
| | $CeO_2$ | | | | 0.142 | 0.069 | 0 |
| | Redox | | | | 0.015 | ~0 | 0.157 |
| | FeO (wt. %) | | | | 0.0002 | ~0 | 0.0011 |
| | LogX | | | | | | |
| Viscosity Data (° C.) | 2 | 1521 | 1526 | 1524 | 1525 | 1532 | 1534 |
| | 2.25 | 1439 | 1445 | 1441 | 1445 | 1448 | 1451 |
| | 2.5 | 1366 | 1372 | 1367 | 1373 | 1374 | 1377 |
| | 2.75 | 1301 | 1307 | 1302 | 1308 | 1308 | 1311 |
| | 3 | 1241 | 1247 | 1243 | 1249 | 1248 | 1251 |
| | 3.25 | 1188 | 1193 | 1189 | 1195 | 1194 | 1198 |
| | 3.5 | 1139 | 1144 | 1141 | 1145 | 1145 | 1149 |
| | 3.75 | 1094 | 1098 | 1097 | 1100 | 1101 | 1104 |
| | 4 | 1052 | 1057 | 1056 | 1058 | 1060 | 1063 |
| | 4.25 | 1014 | 1018 | 1019 | 1020 | 1022 | 1026 |
| | 4.5 | 978.9 | 982.6 | 984.4 | 983.9 | 987.6 | 990.9 |
| | 4.75 | 946.2 | 949.5 | 952.5 | 950.5 | 955.5 | 958.8 |
| | 5 | 915.7 | 918.6 | 923 | 919.4 | 925.7 | 929 |
| | 7.6 | | | 719.4 | | 718.1 | 724.8 |
| | 13 | | | 515 | | 515 | 518 |
| | 14.5 | | | 479 | | 478 | 481 |
| | 15.2 | | | 463 | | 462 | 465 |
| Liquidus Data (° C.) | | 874 | 876 | 883 | 878 | 879 | 879 |
| Transmission Data (%) | LTC, 2° | 90.03 | 90.51 | 90.84 | 90.38 | 90.85 | 90.82 |
| | UV (295-395 nm) | 45.46 | 54.80 | 60.56 | 64.68 | 70.54 | 84.76 |
| | IR (775-2125 nm) | 91.55 | 91.59 | 91.80 | 91.73 | 91.76 | 90.81 |
| | TSET (275-2125 nm) | 89.41 | 89.90 | 90.37 | 90.26 | 90.77 | 90.60 |

*Analysis by X-Ray Fluorescence Spectrometry, which cannot measure lithium, therefore lithium oxide batch data was input.

The data in Table 3 shows the glass can be manufactured on a float line (see FIG. 2) as the liquidus is significantly below the Log 4 temperature (the temperature at which the viscosity is 10,000 poise; during float production, this temperature would be sufficiently downstream so that the glass is moving fast and there is insufficient time for crystallization to occur). The liquidus data in the table does not include the presence of anomalous crystals that occurred in the higher cerium oxide content glasses (the 0.15% ceria and higher had these crystals, the 0.10% appeared to have very small crystallites but they were too small to be positively identified as crystals, the 0 and 0.05% ceria did not have any of these crystals) as a result of the liquidus determination. The presence of these anomalous crystals does not necessarily indicate the glass cannot be made as the liquidus is measured over a 24 hour time frame, which is far greater than the time on the float line where these temperature ranges occur. To avoid the formation of these anomalous crystals, the use of cerium oxide in concentrations below 0.15 wt. % is preferred, and more preferably no higher than 0.10 wt. %. The liquidus was determined by exposing the glass to high temperatures in a gradient furnace for 24 hours and reporting the temperature of the glass where crystals first form per ASTM C829-81; this same procedure was used for all data discussed herein.

The redox data for examples 11 and 12 in Table 3 also show the ceria-containing glasses are highly oxidized (low redox) and have greater transmission in the Infrared (IR) portion of the light spectrum where the effect of decreasing ferrous oxide content is more significant. The use of ceria as an ultraviolet light (UV) absorber can also be seen in the UV transmission data. The lower total solar energy transmitted (TSET) is attributed mostly to the greater UV absorption of the high ceria glasses; although the UV is only a small part of the TSET, it is sufficient to drop the values.

In one aspect of the invention cerium oxide ($CeO_2$) is added to the batch materials to make LIRA lithium glass. Four lab melts were prepared and the glass made analyzed only for spectroscopy and liquidus to determine if the batch materials could be melted and a glass ribbon made practicing the float glass process, which is well known in the glass making art and discussed in detail below. Composition of the glass (as calculated from batch) and liquidus values are presented in Table 4, below. Similar to the previous section, several of these melts were evaluated for liquidus to ensure there should be no crystallization in float glasses of these compositions with a higher iron oxide level.

TABLE 4

Batch compositions, liquidus data, and spectral data of four melts with varying low levels of cerium oxide content and a low iron oxide level.

| | | 14 | 15 | 16 | 17 |
|---|---|---|---|---|---|
| Batch Data (wt. %) | $SiO_2$ | 61.46 | 61.46 | 61.46 | 61.46 |
| | $Na_2O$ | 10.88 | 10.88 | 10.88 | 10.88 |
| | CaO | 0.047 | 0.047 | 0.047 | 0.047 |
| | MgO | 0.005 | 0.005 | 0.005 | 0.005 |
| | $SO_3$ | 0.080 | 0.080 | 0.080 | 0.080 |
| | $Fe_2O_3$ | 0.011 | 0.011 | 0.011 | 0.011 |
| | $Al_2O_3$ | 18.12 | 18.14 | 18.15 | 18.16 |
| | $ZrO_2$ | 4.05 | 4.05 | 4.05 | 4.05 |
| | $Li_2O$ | 5.22 | 5.22 | 5.22 | 5.22 |
| | $CeO_2$ | 0.070 | 0.050 | 0.040 | 0.030 |
| | $K_2O$ | 0.038 | 0.038 | 0.038 | 0.038 |
| | $TiO_2$ | 0.019 | 0.019 | 0.019 | 0.019 |
| | total | 100.00 | 100.00 | 100.00 | 100.00 |
| Liquidus | ° C. | 876 | 878 | 865 | 880 |
| Transmission Data (%) | LTC, 2° | 90.86 | 90.95 | 90.82 | 90.72 |
| | UV (295-395 nm) | 66.96 | 69.75 | 71.13 | 72.96 |
| | IR (775-2125 nm) | 91.76 | 91.75 | 91.70 | 91.67 |
| | TSET (275-2125 nm) | 90.62 | 90.80 | 90.75 | 90.74 |

(transmission data are recalculated to 0.223 inch control thickness)

The liquidus data shows the glass compositions of Table 4 can be melted and a glass ribbon manufactured on a float line, as discussed above (the log 4 temperature is expected to be quite similar to those glasses in Table 3). No anomalous crystals were observed as a result of the liquidus experiment, consistent with the previous data from Table 3 for glasses with low cerium oxide content.

The seven examples 18 to 24 of Table 5 were prepared and analyzed. Compositions of these lab melts as calculated from batch components follow in Table 5. These glasses have the composition of the lithium glass of Table 1, ferric and ferrous oxides, and less than a total of 5 wt. % impurities usually found with glass batches as discussed above.

TABLE 5

Batch compositions of mid-level iron oxide compositions with varying $MnO_2$ and $CeO_2$ content.

| | 18 wt. % | 19 wt. % | 20 wt. % | 21 wt. % | 22 wt. % | 23 wt. % | 24 wt. % |
|---|---|---|---|---|---|---|---|
| $SiO_2$ | 61.47 | 61.30 | 61.42 | 61.47 | 61.39 | 61.45 | 61.46 |
| $Na_2O$ | 10.89 | 10.88 | 10.88 | 10.89 | 10.88 | 10.88 | 10.88 |
| CaO | 0.047 | 0.047 | 0.047 | 0.047 | 0.047 | 0.047 | 0.047 |
| MgO | 0.005 | 0.005 | 0.005 | 0.005 | 0.005 | 0.005 | 0.005 |
| $SO_3$ | 0.080 | 0.080 | 0.080 | 0.080 | 0.080 | 0.080 | 0.080 |
| $Fe_2O_3$ | 0.033 | 0.030 | 0.030 | 0.033 | 0.030 | 0.030 | 0.030 |
| $Al_2O_3$ | 18.10 | 18.14 | 18.14 | 18.10 | 18.14 | 18.14 | 18.14 |
| $MnO_2$ | 0.00 | 0.150 | 0.00 | 0.00 | 0.050 | 0.00 | 0.00 |
| $ZrO_2$ | 4.05 | 4.05 | 4.05 | 4.05 | 4.05 | 4.05 | 4.05 |
| Cl | 0.002 | 0.002 | 0.002 | 0.002 | 0.002 | 0.002 | 0.002 |
| $CeO_2$ | 0.050 | 0.040 | 0.071 | 0.050 | 0.050 | 0.040 | 0.030 |
| $Li_2O$ | 5.22 | 5.22 | 5.22 | 5.22 | 5.22 | 5.22 | 5.22 |

TABLE 5-continued

Batch compositions of mid-level iron oxide compositions with varying $MnO_2$ and $CeO_2$ content.

| | 18 wt. % | 19 wt. % | 20 wt. % | 21 wt. % | 22 wt. % | 23 wt. % | 24 wt. % |
|---|---|---|---|---|---|---|---|
| $K_2O$ | 0.026 | 0.038 | 0.038 | 0.026 | 0.038 | 0.038 | 0.038 |
| $TiO_2$ | 0.021 | 0.021 | 0.021 | 0.021 | 0.021 | 0.021 | 0.021 |
| total | 100.00 | 100.00 | 100.00 | 100.00 | 100.00 | 100.00 | 100.00 |
| Liquidus (° C.) | 880 | 880 | 887 | 881 | 884 | NA | NA |
| Transmission Data (%) | | | | | | | |
| LTC, 2° | 90.79 | 89.14 | 90.56 | 90.81 | 90.45 | 90.87 | 90.83 |
| UV (295-395 nm) | 70.36 | 67.27 | 68.31 | 67.63 | 68.60 | 70.49 | 71.88 |
| IR (775-2125 nm) | 90.84 | 91.32 | 90.39 | 91.09 | 91.23 | 90.80 | 90.37 |
| TSET (275-2125 nm) | 90.26 | 89.70 | 89.65 | 90.31 | 90.27 | 90.31 | 90.12 |
| Redox | 0.040 | 0.009 | 0.054 | 0.030 | 0.027 | 0.049 | 0.069 |

For comparison, a standard HIRA lithium glass from a production run of the composition in Table 1 except for iron (this standard glass has ~0.095 wt. % total iron oxide without purposely added cerium oxide) was measured for light transmission and the data recalculated to 0.223 inch thickness. This HIRA lithium glass provided values of 88.13% LTC/2° (greater than 395 nanometer ("nm") to less than 775 nm wavelength), 67.26% ultraviolet ("UV" 295-395 nm wavelength), 70.53% infrared ("IR" 775-2125 nm wavelength), and 78.40% total solar energy transmitted ("TSET" 275-2125 nm wavelength). The lack of significant iron oxide content in the glasses of Table 5 (above), coupled with the nature of the cerium oxide that causes most of the iron oxide to be present in the ferric (Fe+++) oxidation state improved the light transmission of the example glasses in Table 5 in the visible (LTC/2°), infrared (IR) ranges over that of the standard HIRA lithium glass.

It is shown in Table 5 that the LIRA lithium glass having cerium oxide has a liquidus in a range of 880 to 887° C., which is acceptable to make the glass in the float glass process shown in FIGS. 1A, 1B, and 2 as the log 4 temperature is typically about 1,060° C. for glasses of this concentration. Anomalous crystals were not observed in these tests.

Example 21 of Table 5 was intended to be an exact repeat of Example 18 of Table 5 for a measure of repeatability. However, the spectral data and redox are not identical and the reason for the difference is not known, but it is believed that the weighing of the batch materials was the problem.

In one aspect of the invention, cerium oxide is added as both an ultraviolet light absorber and as a redox control agent. Since the iron oxide level is significantly reduced from the 0.10 wt. % level of the HIRA lithium glass, it is necessary to add some cerium oxide to provide the same or better UV protection as that HIRA lithium glass. The cerium also causes the iron oxide in the glass to be predominantly in the ferric state, which also absorbs UV light but is essentially transparent in most of the visible and in the infrared wavelength ranges.

Two lab melts identified as Examples 19 and 22 were made and the data listed on Table 5 contained additions of manganese oxide. Manganese oxide is known to be a redox control agent capable of oxidizing the ferrous iron (Fe++) oxide in the glass to the ferric (Fe+++) oxidation state.

In the case of the manganese-containing melts, the initial data looked promising. However solarization (i.e., light-induced changes in the redox of the glass that manifests itself in different spectral properties) caused the glass to turn purple. The light transmission data in the Table 6 below are for examples 19 and 22 with the batch $MnO_2$ concentrations in Table 5, both also contain cerium oxide. Included in the table are the light transmission data for the two glasses after the chemical tempering process and after solarizing the glass by exposing the glass to simulated sunlight in a Q-Sun chamber[1]. The testing procedure includes exposure for 150 hours in a Q-Sun 1000 xenon test chamber set and maintained at 0.68 Watts/$m^2$ ("W/$m^2$") at 340 nm. This exposure simulates the outdoor exposure of glass to natural sunlight (noon summer sun). All light transmission data are calculated to a uniform glass thickness of 0.223 inch and are corrected for cerium oxide fluorescence.

1. Manufactured by Q-Panel Corporation, Cleveland, Ohio

TABLE 6

Integrated spectral attributes, in % transmittance, and redox data of glass compositions containing manganese oxide with cerium oxide.

| | Ex. 19 0.15% $MnO_2$ | | | Ex. 22 0.05% $MnO_2$ | | |
|---|---|---|---|---|---|---|
| | Initial | Chem. Temp. | Solarized | Intial | Chem. Temp. | Solarized |
| LTC/2° observer | 89.1% | 89.0% | 79.5% | 90.4% | 90.5% | 86.6% |
| UV (295-395 nm) | 67.3% | 69.4% | 52.1% | 70.4% | 70.4% | 52.7% |
| IR (775-395 nm) | 91.3% | 91.3% | 84.2% | 91.1% | 91.2% | 84.6% |
| TSET (275-2125 nm) | 89.75 | 89.6% | 81.9% | 90.2% | 90.3% | 85.0% |
| Redox | 0.01 | 0.02 | 0.28 | 0.03 | 0.03 | 0.34 |

In Table 6, one sample of each Example was measured for spectroscopy, then chemically tempered, then solarized. The exact sample was different than the sample chosen for the spectral data in Table 5, which explains slight differences in the spectral data between the two Tables, which may be due to a small amount of solarization prior to testing.

The low redox provided by the combination of cerium and manganese oxides resulted in solarization of the manganese oxide to a purple form. These samples became light purple after solarization and losses in light transmission across the ultraviolet, visible, and infrared regions are evident in the solarized data of Table 6.

In one non-limiting aspect of the invention, cerium oxide ($CeO_2$) and/or manganese oxide ($MnO_2$) is/are used to oxidize the ferrous iron to the ferric iron. As discussed above, cerium oxide and manganese oxide are compatible, e.g. result in glasses with an acceptable liquidus temperature for the glass making process shown in FIGS. 1A, 1B and 2. In the preferred practice of the invention, cerium oxide ($CeO_2$) is used to oxidize the ferrous iron to the ferric iron because cerium oxide ($CeO_2$) is a more effective oxidizer than manganese oxide ($MnO_2$) as shown by FIGS. 3 and 4.

In the practice of the invention, cerium oxide in the range of greater than 0 to 0.50 wt. % can be used; in the range of 0.02 to 0.45 wt. % is preferred, and in the range of 0.03 to 0.40 wt. % is more preferred. Other ranges for cerium oxide include but are not limited to 0.01 to 0.15 wt. %; 0.02 to 0.10 wt. % and 0.03 to 0.07 wt. %. Manganese oxide in the range of greater than 0 to 0.75 wt. % can be used, in the range of 0.02 to 0.50 wt. % is preferred, and in the amount of 0.04 to 0.45 wt. % is more preferred. As can be appreciated, a mixture of $CeO_2$ and $MnO_2$ can be used in the practice of the invention to oxidize the ferrous iron. Glasses of lower total iron content can use lower amounts of cerium oxide or manganese oxide. The amount of cerium oxide or manganese oxide in this specification shall mean total cerium or manganese, respectively, expressed in terms of $CeO_2$ or $MnO_2$, even though these components may not actually be present in the glass as $CeO_2$ or $MnO_2$ and may be present as other oxides such as $Ce_3O_4$ or $MnO$, or as non-oxides.

Samples of the glass of Table 5 having additions of cerium oxide and manganese oxide were made to, among other things, determine if these glass compositions are compatible with the float glass process as determined by the liquidus temperatures of these glasses and log 4 viscosity temperatures of similar glasses from Table 3. Data indicate float glass process compatibility and no anomalous crystals were observed in the liquidus samples.

As discussed above, the wt. % of ferrous oxide is higher for the HIRA lithium glass to increase the absorption of the infrared wavelengths to decrease the heating time of the glass to reach the bending temperatures or to provide a level of solar heat control, and the wt. % of the ferrous oxide is lower for the LIRA lithium glass to reduce the absorption of infrared energy in the infrared viewing range and increases the percent transmittance of the infrared energy in the infrared viewing range to enhance the viewing of the infrared generating objects or to increase the visible light transmission of a window. For purposes of clarity, the ultraviolet wavelength range is 295-395 nanometers (hereinafter also referred to as "nm"); the visible wavelength range is greater than 395 to less than 775 nm; and the near infrared wavelength range is 775 to 2100 nm; of the electromagnetic spectrum. The infrared viewing wavelength range is device dependent and can include much of the visible light range. In one no-limiting embodiment of the invention, the infrared viewing wavelength range is 400 to 920 nm of the electromagnetic spectrum. In the practice of the invention, the LIRA lithium glass preferably has a visible transmission of equal to and greater than 88%, more preferably a visible transmission of greater than 89% and most preferably a visible transmission of greater than 90%; an infrared transmission of equal to and greater than 80%, more preferably an infrared transmission of greater than 85% and most preferably an infrared transmission of equal to and greater than 90%; an infrared viewing transmission of equal to and greater than 80%, more preferably an infrared viewing transmission of greater than 85% and most preferably an infrared viewing transmission of greater than 90%.

Further, in the practice of the invention, the HIRA lithium glass has a visible transmission of less than 89%; an infrared transmission of less than 80%; an infrared viewing transmission of less than 80%.

The spectral properties of the LIRA and the HIRA lithium glasses given above are reported at a thickness of 0.223 inch (5.7 millimeters). The visible transmission is determined using CIE Standard Illuminant A with a 2° observer over a wavelength range of 380 to 780 nanometers. The infrared transmittance is determined using Parry Moon air mass 2.0 direct solar irradiance data over a wavelength range of 800 to 2100 nm. The viewing transmittance is determined using the relative spectral irradiance of CIE Standard Illuminant A and the response function of the viewing device over the wavelength range 400 to 930 nm.

Shown in Table 7 below is the redox data for HIRA Lithium glass and for LIRA Lithium glass for one non-limiting aspect of the invention. The redox data of Table 7 can be used with the glass composition of Table 1.

TABLE 7

Redox data for HIRA and LIRA lithium glasses.

| | HIRA Lithium Glass (no ceria) | Low Iron LIRA Lithium Glass with Ceria | Mid-Iron LIRA Lithium Glass with Ceria |
|---|---|---|---|
| Total iron oxide as Fe2O3 | 0.09-0.12% | 0.005-0.025% | 0.025-0.05% |
| [FeO] | 0.018-0.05% | 0-0.0025% | 0-0.005% |
| Redox | 0.2-0.4 | 0-0.1 | 0-0.1 |

In one non-limiting aspect of the invention, from the data in Tables 2-6 for the LIRA lithium glass, the LIRA lithium glass within the ultraviolet ("UV") wavelength range of 295-395 nm has a transmission in the range of 50-85%; the LIRA lithium glass within a visible ("LTC/2°") wavelength range of 395-775 has a transmission in the range of 89-92%; the LIRA lithium glass within an infrared ("IR") wavelength range of 775-2125 has a transmission in the range of range of 80-92%; and the LIRA lithium glass within a total solar energy transmittance ("TSET") wavelength range of 275-2125 nm has a transmission in the range of 82-92%. Further it is expected that the HIRA lithium glass within the ultraviolet ("UV") wavelength range of 295-395 nm will have a transmission in the range of 67-74 wt. %; the HIRA lithium glass within a visible ("LTC/2°") wavelength range of 395-775 will have a transmission in the range of 88-90 wt. %; the HIRA lithium glass within an infrared ("IR") wavelength range of 775-2125 will have a transmission in the range of 70-79 wt. %; and the HIRA lithium glass within a total solar energy transmittance ("TSET") wavelength range of 275-2125 nm will have a transmission in the range of 78-84 wt. %. The LIRA and the HIRA lithium glasses given above are reported at a thickness of 0.223 inch (5.7 millimeters).

Glass Making Processes of the Invention

Figure 2:
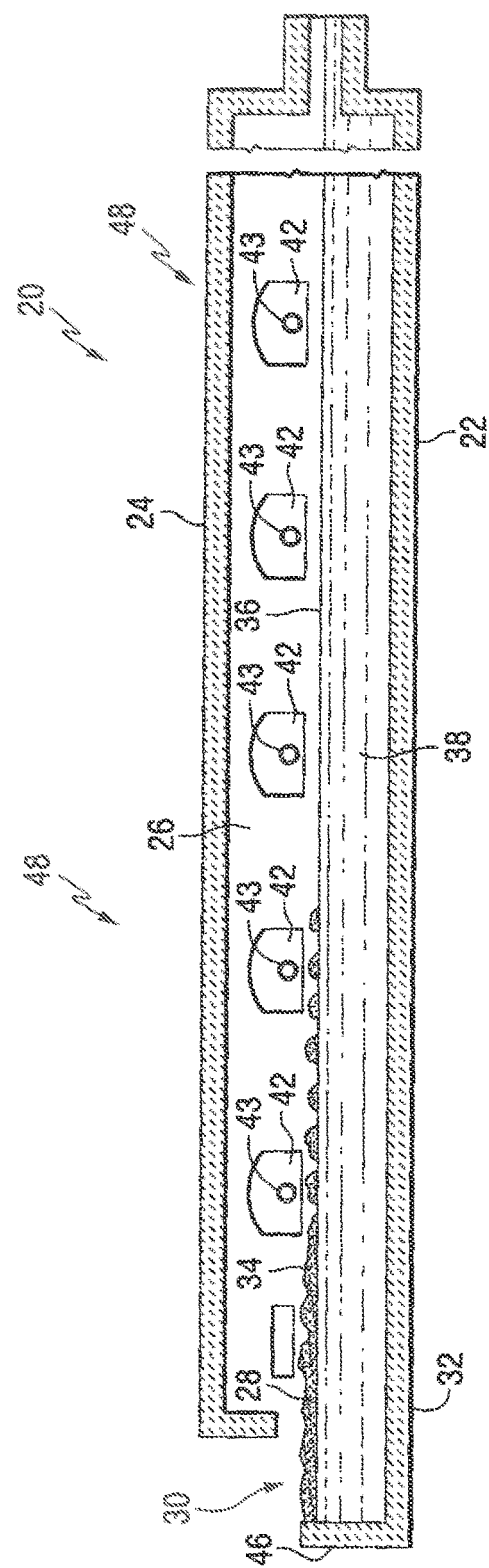
FIG. 2 is an elevated cross sectional side view of the glass melting chamber shown in FIG. 1A.

The LIRA and HIRA lithium glasses of the invention can be made using a conventional non-vacuum refiner float glass system, e.g. but not limited to the type shown in FIGS. 1 and 2, or using a vacuum refiner float glass system, e.g. but not limited to the type disclosed in U.S. Pat. Nos. 4,792,536 and 5,030,594, which patents are hereby incorporated by reference).

Shown in FIGS. 1A, 1B and 2 is an apparatus that is used in the practice of a non-limiting aspect of the invention to make a continuous glass ribbon of float glass. Referring now to FIGS. 1A, 1B and 2 as needed, conventional continuously fed, cross-tank fired, glass melting and non-vacuum refining furnace 20 includes an enclosure formed by a bottom 22, roof 24, and sidewalls 26 made of refractory materials. The HIRA or the LIRA lithium glass batch materials 28 are introduced through inlet opening 30 (see FIG. 2) in an extension 32 of the furnace 20 known as the fill doghouse in any convenient or usual manner to form a blanket 34 floating on surface 36 of molten glass 38 (see FIG. 2). Overall progression of the glass as shown in FIGS. 1A, 1B and 2 is from left to right in the figures, toward entrance end 39 of a glass forming chamber 40 (see FIG. 18) of the type used in the art to make float flat glass.

Flames (not shown) to melt the batch materials 28 and to heat the molten glass 38 issue from burner ports 42 spaced along the sidewalls 26 (see FIG. 2) and are directed onto and across the surface 36 of the molten glass 38. As is known by those skilled in the art, during the first half of a heating cycle, the flames issue from a nozzle 43 (see FIG. 2) in each of the ports on one side of the tank 20, as the exhaust of the furnace moves through the ports on the opposite side of the furnace. During the second half of the heating cycle, the function of the ports is reversed, and the exhaust ports are the firing ports, and the firing ports are the exhaust ports. The firing cycle for furnaces 20 of the type shown in FIGS. 1A, 1B and 2 are well known in the art and no further discussion is deemed necessary.

As can be appreciated by those skilled in the art, the invention contemplates using a mixture of air and fuel gas, or a mixture of oxygen and fuel gas, to generate the flames to heat the batch materials and the molten glass. For a discussion of using oxygen and fuel gas in a glass melting furnace, reference can be made to U.S. Patent Application Publication No. 2009-0205711 A1 titled "Use of Photovoltaic for Waste Heat Recovery", and/or U.S. Pat. No. 8,304,358, which Publications are incorporated herein by reference.

The glass batch materials 28 moving downstream from the batch feeding end or doghouse end wall 46 are melted in the melting section 48 of the furnace 20, and the molten glass 38 moves through waist 54 (see FIGS. 1A and 1B) to refining section 56 of the furnace 20. In the refining section 56, bubbles in the molten glass 38 are removed, and the molten glass 38 is mixed or homogenized as the molten glass passes through the refining section 56. The molten glass 38 is delivered in any convenient or usual manner from the refining section 56 onto a pool of molten metal (not shown) contained in the glass-forming chamber 40. As the delivered molten glass 38 moves through the glass-forming chamber 40 on the pool of molten metal (not shown), the molten glass is sized and cooled. A dimensionally stable sized glass ribbon (not shown) moves out of the glass-forming chamber 40 into an annealing lehr (not shown). Glass making apparatus of the type shown in FIGS. 1A, 1B and 2, and of the type discussed above are well known in the art and no further discussion is deemed necessary.

As can now be appreciated by those skilled in the art, when changing from a Campaign making HIRA lithium glass to a Campaign making LIRA lithium glass, the ferrous iron (FeO) in the molten HIRA lithium glass contained in the furnace 20 (see FIGS. 1A, 1B and 2) at the end of the Campaign for making HIRA lithium glass in one non-limiting aspect of the invention is decreased from a range of 0.018-0.05 wt. % to a range of 0.0005 to 0.015 wt. %, and more preferably to a range of 0.001-0.010 wt. %, and the redox ratio is preferably reduced from a range of 02 to 0.4 to a range of 0.005-0.15 and more preferably to a range of 0.005-0.10.

In the practice of the invention, the conversion of 1850 tons of molten HIRA lithium glass contained in a furnace, e.g. but not limited to the furnace 20 shown in FIGS. 1A, 1B and 2 to 1850 tons of molten LIRA lithium glass is made in 3 to 4 days, whereas to make the conversion by adding only LIRA lithium glass batch ingredients without oxidizers would take about two weeks.

For purposes of clarity, as used herein the term "Campaign" means making an amount of glass, e.g. but not limited to a flat glass ribbon, having a range of properties, e.g. but not limited to optical and color properties using an amount of glass batch materials or ingredients.

In the practice of the invention, the change from molten HIRA lithium glass to molten LIRA lithium glass can be made in 3 to 4 days using an oxidizing agent. The oxidizing agent is preferably compatible with the glass making process practiced to make the HIRA and LIRA lithium glass, and oxidize the ferrous iron to the ferric iron. In one non-limiting aspect of the invention, cerium oxide ($CeO_2$) and/or manganese oxide ($MnO_2$) is/are used to oxidize the ferrous iron to the ferric iron. As discussed above, cerium oxide and manganese oxide are compatible, e.g. are components of a glass composition that is compatible with the glass making process shown in FIGS. 1A, 1B and 2. In the preferred practice of the invention, cerium oxide ($CeO_2$) is used to oxidize the ferrous iron to the ferric iron because cerium oxide ($CeO_2$) is a more effective oxidizer than manganese oxide ($MnO_2$) as shown by the data plotted in the graphs of FIGS. 3 and 4. Cerium oxide ($CeO_2$) as used in the practice of the invention includes various forms of cerium oxide including but not limited to cerium (III) oxide ($Ce_2O_3$) and cerium carbonate ($Ce_2(CO_3)_3 \cdot xH_2O$).

In the following non-limiting embodiment of the invention, Campaign A is active to make HIRA lithium glass. Campaign A is designated to end and Campaign B started to make LIRA lithium glass. The composition of the HIRA lithium glass being made and the composition of the LIRA lithium glass to be made are shown in TABLE 8.

TABLE 8

| Component | HIRA Lithium glass Campaign A | LIRA Lithium glass Campaign B |
|---|---|---|
| $SiO_2$ | 59-63 wt. % | 60-63 wt. % |
| $Na_2O$ | 10-13 wt. % | 10-12 wt. % |
| $Li_2O$ | 4-5.5 wt. % | 4-5.5 wt. % |
| $Al_2O_3$ | 15-23 wt. % | 17-19 wt. % |
| $ZrO_2$ | 2-5 wt. % | 3.5-5 wt. % |
| ($Al_2O_3 + ZrO_2$) | 19-25 wt. % | 21.5-24 wt. % |
| FeO | 0.02-0.05 wt. % | 0.001-0.010 wt. % |
| $FeO/Fe_2O_3$ | 0.2-0.4 | 0.005-0.15 |
| $CeO_2$ | 0.00 | 0.02-0.45 wt. % |
| $Fe_2O_3$ (total iron) | 800-1200 ppm | 50-less than 800 ppm |

During the running of Campaign A, the HIRA lithium glass batch materials listed in Table 8 are fed into the furnace 20 (see FIGS. 1A, 1B and 2), melted and refined, and the refined glass moved into the glass forming chamber 40 as discussed above to make the HIRA lithium glass. At the designated time when Campaign A is to end, the glass batch materials for the LIRA lithium glass are moved into the melting section 48 of the furnace 20 as discussed above to start Campaign B. During the first 38 hour period of Campaign B, the batch materials for the LIRA lithium glass are formulated to provide a lithium glass having cerium oxide in the range of 0.04-0.90 wt. %, i.e. twice the cerium oxide specified for the lithium glass of Table 8. After the thirty six hour period, the batch materials for the LIRA lithium glass are formulated to provide a lithium glass having cerium oxide in the range of 0.02-0.45 wt. % (see Table 8).

In an aspect of the invention, cerium carbonate is added to the batch materials to change from Campaign A to Campaign B to make the LIRA lithium glass having the ingredients listed in Table 8 except the cerium carbonate in the range of 0.033-0.75 wt. % is added to the batch materials. With the initial LIRA lithium glass batch materials (the first thirty six hour period of Campaign B), cerium carbonate in the wt. % range of 0.066-1.50 wt. % is added to the batch materials. As is appreciated, the range 0.066-1.50 wt. % is twice the range of $CeO_2$ for the glass composition of Table 8 after the loss of carbon dioxide and water as a result of the glassmaking process and expressing the cerium oxide content as $CeO_2$, regardless of its actual oxidation state. At the end of the initial thirty six hour period of Campaign B, the cerium carbonate is reduced to a range of 0.033-0.75 wt. % to run Campaign B to make the LIRA lithium glass having the glass composition shown in Table 8. The additional cerium carbonate added during the first thirty six hour period of Campaign B is made to more quickly oxidize the ferrous iron in the melting section 26 and in the refining section 56 of the furnace 20.

In another non-limiting embodiment of the invention, if a glass being made has sufficient UV absorber, e.g. cerium oxide, after the initial thirty-six hour pulse, no further pulses of cerium carbonate are necessary.

The invention is not limited to the number or the length of the pulses (i.e., a higher concentration of a glass component added over a limited time period), or the wt. % of the cerium oxide in the pulses. In the practice of the invention, the wt. % of cerium oxide in the pulse is usually 2 to 3 times the wt. % of cerium oxide added to the LIRA lithium glass batch, and the number of pulses is usually one or two. The time period of each pulse can be varied as needed. The above procedure directed to the use of $CeO_2$ to oxidize the ferrous iron when changing from Campaign A to Campaign B is applicable to the practice of the invention using $MnO_2$, or a mixture of $CeO_2$ and $MnO_2$, to change from Campaign A making HIRA lithium glass to Campaign B making LIRA lithium glass. Although the procedure is the same, the wt. % of $MnO_2$, and of the mixture of $CeO_2$ and $MnO_2$ is increased because the cerium oxide, a more effective oxidizer than manganese oxide, is reduced.

The invention is not limited to the additions of the oxidizers, e.g. but not limited to $CeO_2$, $MnO_2$, and mixtures of $CeO_2$ and $MnO_2$ to the batch materials, and the invention contemplates adding the additional oxidizer to the molten glass in the refiner 56 or to the molten glass in the melter 48 at a position upstream from the waist 54.

In another non-limiting embodiment of the invention, a campaign making LIRA lithium glass is changed to a campaign making HIRA lithium glass by making additions of a reducing agent to reduce the ferric iron $Fe_2O_3$ to ferrous iron FeO. Reducing agents that can be used in the practice of the invention include, but are not limited to carbon, carbon containing materials, e.g. but not limited to graphite, sucrose ($C_{12}H_{22}O_{11}$), coal, silicon metal and tin oxide ($SnO_2$). Additional non-limiting aspects of the invention include, but are not limited to, adding oxidizers and reducers to glass batch materials to change FeO to $Fe_2O_3$ or to change $Fe_2O_3$ to FeO as the case may be, when changing campaigns for making different types of soda-lime silicate glasses or any other types of glasses, e.g. going from a HIRA or LIRA lithium glass to a soda-lime silicate glass, or vice versa.

Further, the invention can be practiced to change from one Campaign making a soda-lime-silicate glass having a high iron content, e.g. but not limited to ferrous oxide in the range of 0.02 to 0.04 wt. %, and a redox ratio in the range of 0.2 to 0.4, to another Campaign making a soda-lime-silicate glass having a low iron content, e.g. but not limited to ferrous oxide in the range of 0.001 to 0.010 wt. %, and a redox ratio in the range of 0.005 to 0.15.

Non-Limiting Aspects of the Articles of the Invention

Figure 5:
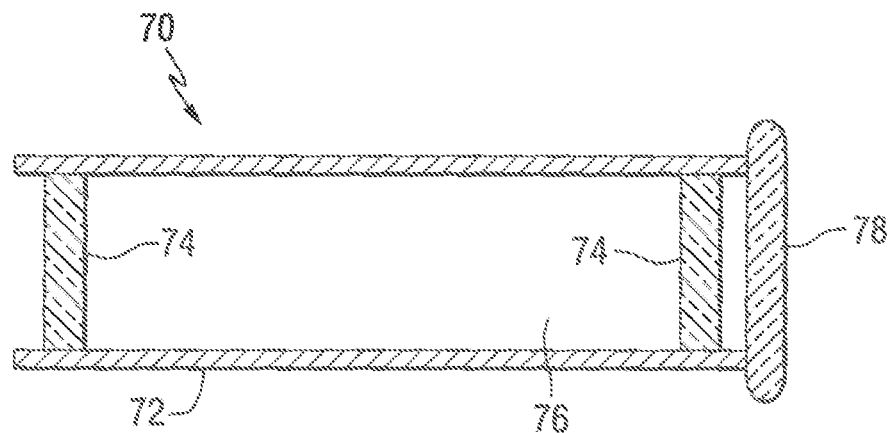
FIG. 5 is a cross sectional side view of a night vision scope of the invention having a protective lens made in accordance to the teachings of the invention.

The use of the LIRA lithium glass and the use of the HIRA lithium glass, e.g. but not limiting to the invention, the HIRA lithium glass and the LIRA lithium glass of Table 8, can be processed for use in windows for land, air, space, above water and below water, vehicles; transparencies for commercial and residential windows, covers for solar collectors, and for ballistic viewing windows. The use of the HIRA lithium glass is generally used for viewing windows passing visible light, and/or for heating and shaping lithium glass sheets, and is generally not recommended for viewing infrared energy from objects, e.g. the use of HIRA lithium glasses is not recommended for night goggles because it absorbs infrared energy. For night vision equipment, the LIRA lithium glass is recommended to protect the lens system of the night vision equipment, e.g. but not limited to night vision goggles and night vision scopes. Further the LIRA lithium glass is also recommended for use in aircraft windshields because it has a high visible and IR transmission. More particularly and with reference to FIG. 5, there is a shown a night vision rifle scope 70 having a tube 72 and a night vision magnifying lens system 74 mounted in passageway 76 of the tube 72. A ballistic lens 78 made of a chemically strengthened LIRA lithium glass is mounted at an end of the tube spaced from the lens system 74. With this arrangement, the chemically strengthened LIRA lithium glass lens of the invention protects the lens system 74 against breakage. The LIRA lithium glass and the HIRA lithium glass can also be used for specialty applications, including but not limiting to the invention its use in furniture, appliances, and shower doors.

Figure 6:
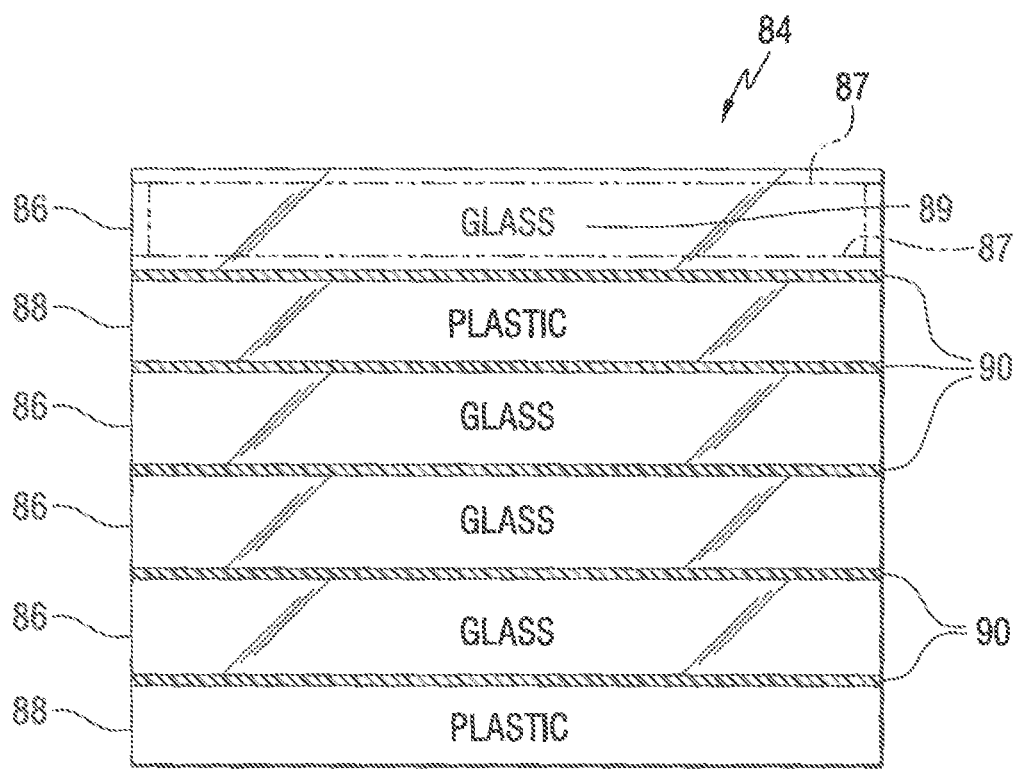
FIG. 6 is a side elevated view of a laminated ballistic lens or window incorporating features of the invention.

With reference to FIG. 6, there is shown a non-limiting embodiment of a ballistic lens or window 84. The window 84 includes a plurality of LIRA lithium chemically strengthened glass sheets 86 and plastic sheets 88 laminated together by plastic interlayer material 90 of the type used in the laminating art. Plastic sheets that may be used in the invention include, but are not limited to, polycarbonate, acrylic, stretched acrylic, polyurethane, polyureaurethane, and polyurethanes containing ester or carbonate groups.

As is appreciated by those skilled in the art, a thumbprint of sodium chemically strengthened glass is a higher concentration of sodium ions at the near surface region 87 of the chemically strengthened glass piece 86 shown in phantom in FIG. 6 and numbered "87", and a decrease in sodium on concentration as the distance to the center 89 of the chemically strengthened glass decreases. More particularly, lithium glass that is chemically tempered in a sodium salt bath has higher concentration of sodium oxide and lower concentration of lithium oxide in the near surface region 87 (see FIG. 6) than is shown in Table 1. The ion exchange depth is typically less than 0.020 inches from every surface of the glass ply, and in one aspect of the invention the amount of ion exchange becomes negligible after 0.020 inches from the surface.

In the practice of the non-limiting embodiments of the invention, the LIRA and HIRA lithium glasses can be uncoated or coated with any type of coating, e.g. but not limited to an environmental coating to selectively pass, absorb, or reflect predetermined wavelength ranges of light and energy, a photocatalytic film or water-reducing film, or a transparent conducting oxide e.g. of the types disclosed in U.S. Pat. Nos. 5,873,203 and 5,469,657, which patents are incorporated herein by reference.

Figure 7:
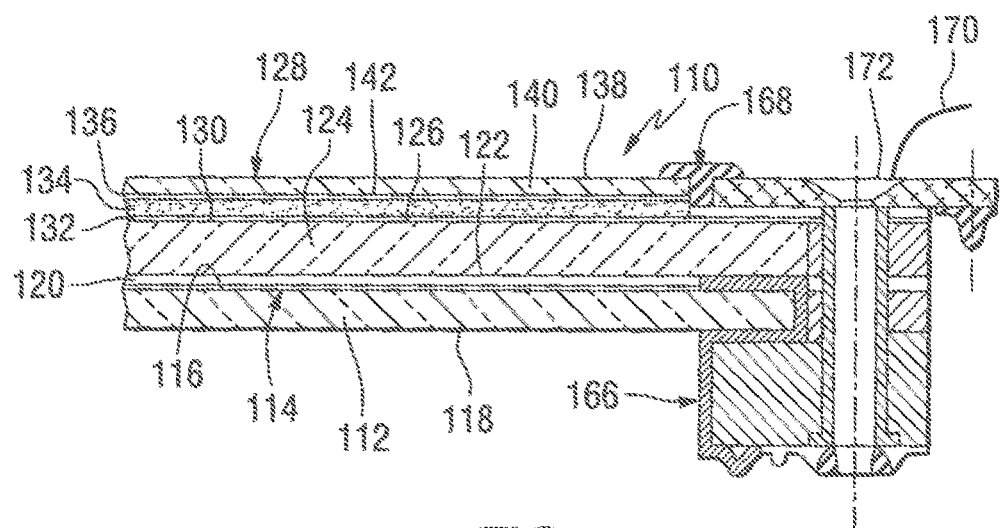
FIG. 7 is a cross sectional view of an end segment of a prior art aircraft windshield.
Figure 8:
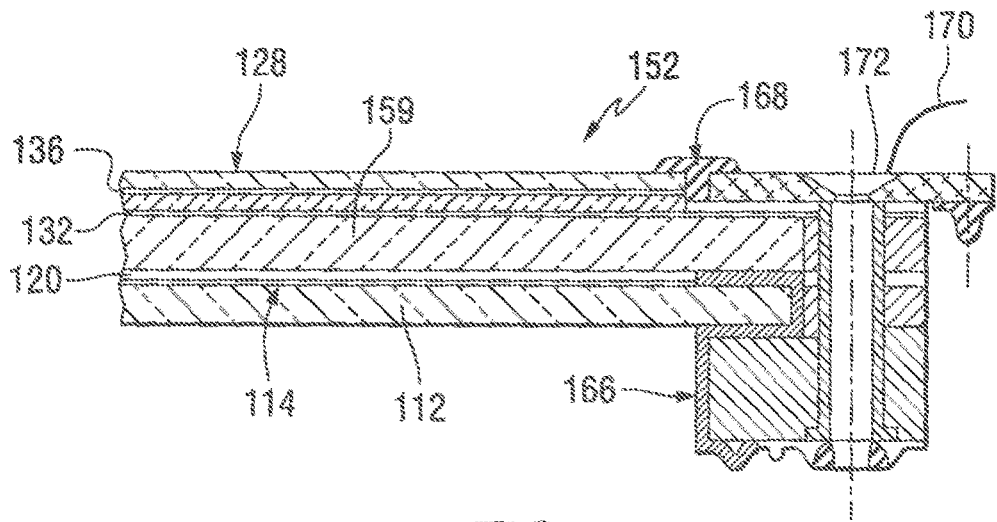
FIG. 8 is a view similar to the view of FIG. 7 showing an aspect of an aircraft windshield of the invention.
Figure 9:
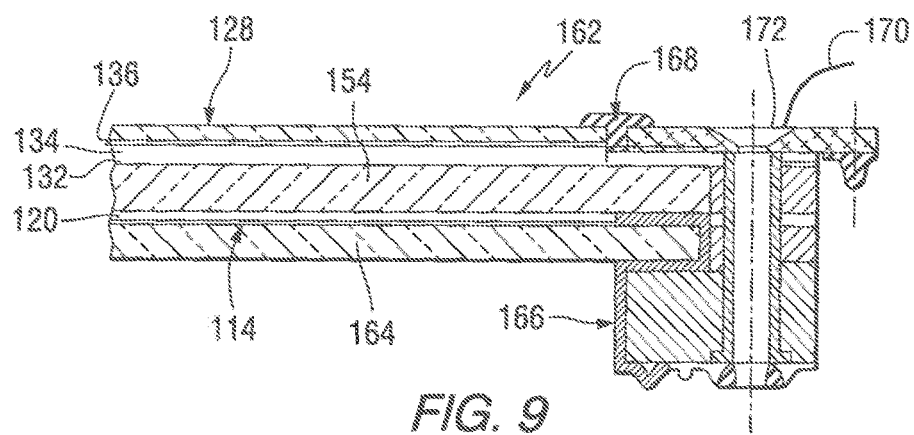
FIG. 9 is a view similar to the view of FIG. 7 showing another aspect of an aircraft windshield of the invention.

Shown in FIGS. 7-9 are cross sectional views of right portions of aircraft windshields. With reference to FIG. 7 there is shown the right portion of a prior art aircraft windshield 110. The windshield 110 includes a glass sheet 112 (hereinafter also referred to as a "first glass sheet 112") having a high intensity radiated field (hereinafter also referred to as "HIRF") film 114 on inner surface 116 of the first glass sheet 112. Outer surface 118 of the first glass sheet 112 is opposite to the inner surface 116 of the first glass sheet 112 and faces the interior of the aircraft (not shown). With this arrangement the surface 118 of the first glass sheet 112 is the inner surface of the windshield 110 and is the outer surface 118 of the first glass sheet 112. A first polyvinyl butyral (hereinafter also referred to as "first PVB") layer 120 overlays and is secured to the HIRF film 114 to secure the first glass sheet 112 to first surface 122 of a glass sheet 124 (hereinafter also referred to as a "second glass sheet 124"). Second surface 126 of the second glass sheet 124 is secured to heating member 128 (see FIG. 10) by an adhesive layer 130 that includes a first urethane layer 132 on the second surface 126 of the second glass sheet 124; a second PVB layer 134 on the first urethane layer 132 and a second urethane layer 136 between and adhered to the second PVB layer 134 and the heatable member 128.

Figure 10:
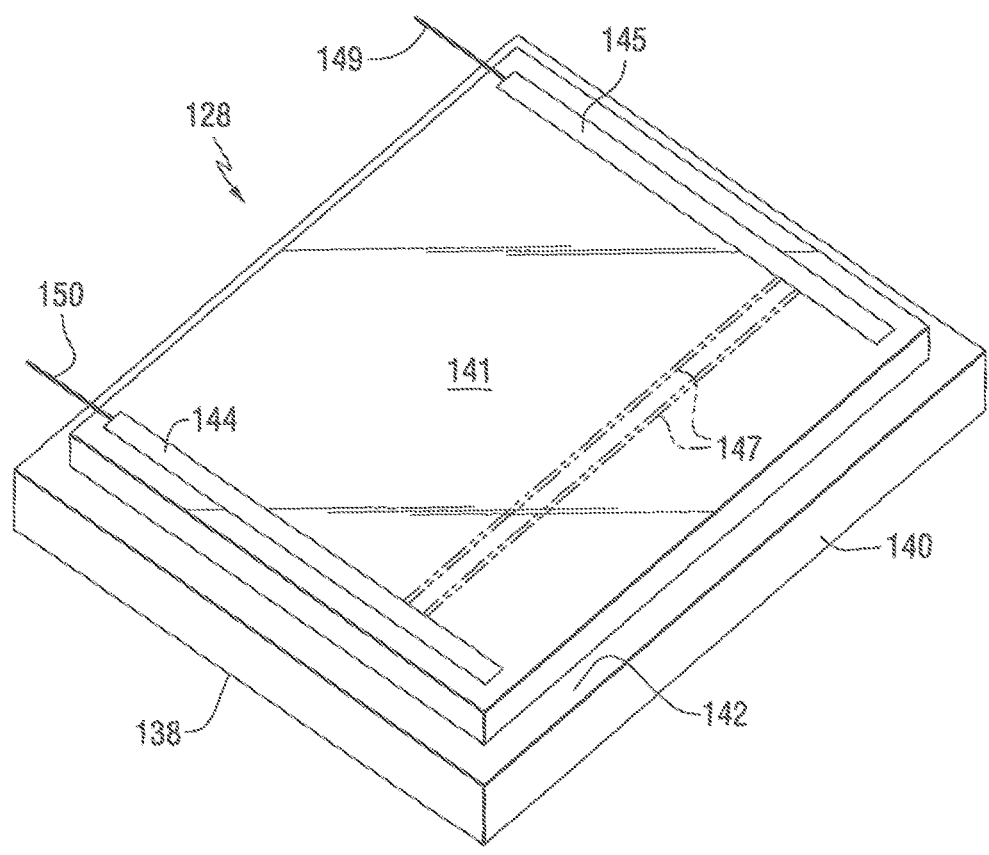
FIG. 10 is a plan view of a heatable member of an aircraft incorporating aspects of the invention.

The invention is not limited to the design and/or construction of the heatable member 128, and any electrical conductive heatable member used in the art to heat a surface of a sheet to prevent the formation of fog, snow and/or ice on, to melt snow and ice on, and/or to remove fog, snow and ice from, outer surface 138 of the windshield 110 can be used in the practice of the invention. In general and not limiting to the invention, shown in FIG. 10 is a non-limiting embodiment of a heatable member designated by the number 128. In one non-limiting embodiment of the invention, the heatable member 128 includes outer glass sheet 140 (also referred to as "third glass sheet") having a conductive coating 141 applied to inner surface 142 of the third glass sheet 140, and a pair of spaced bus bars 144 and 145 in electrical contact with the conductive coating 141.

More particularly, the conductive coating 141 is between and in electrical contact with the bus bars 144 and 145. The invention is not limited to the composition of the conductive coating 141, and any of the electrical conductive coatings known in the art can be used in the practice of the invention. For example, and not limiting to the invention, the conductive coating 141 can be made from any suitable transparent electrical conductive material. Non-limiting embodiments of transparent conductive coatings 141 that can be used in the practice of the invention include, but are not limited to, a pyrolytic deposited fluorine doped tin oxide film of the type sold by PPG Industries, Inc. under the registered trademark NESA; a magnetron sputter deposited tin doped indium oxide film of the type sold by PPG Industries, Inc. under the registered trademark NESATRON; a coating made up of one or more magnetron sputter deposited films, the films including, but not limited to a metal film, e.g. silver between metal oxide films, e.g. zinc oxide and/or zinc stannate, each of which can be applied sequentially by magnetron sputtering, e.g. as disclosed in, but not limited to, U.S. Pat. Nos. 4,610,771; 4,806,220 and 5,821,001. The disclosures of U.S. Pat. Nos. 4,610,771; 4,806,220 and 5,821,001 in their entirety are hereby incorporated by reference.

The invention is not limited to the use of an electrical conductive coating 141 to heat the glass sheet 140, and the invention contemplates the use of any type of member that can be electrically heated, e.g. but not limited to electrical conducting wires, e.g. wires 147 shown in phantom in FIG. 10 can be embedded in a sheet of a plastic interlayer, e.g. but not limited to the second urethane interlayer 136 between the bus bars 144 and 145, and electrically connected to the bus bars 144 and 145. Such a heating arrangement is known in the art under the PPG Industries Ohio, Inc. registered trademark AIRCON and is disclosed in U.S. Pat. No. 4,078,107, which patent in its entirety is incorporated herein by reference.

The invention is not limited to the design and/or construction of the bus bars 144 and 145, and any of the types of bus bars used in the art can be used in the practice of the invention. Examples of bus bars that can be used in the practice of the invention, include, but are not limited to, the types disclosed in U.S. Pat. Nos. 3,762,902; 4,623,389 and 4,902,875, which patents in their entirety are hereby incorporated by reference.

With continued reference to FIG. 10, in one non-limiting embodiment of the invention, the bus bars 144 and 145 are connected by a wire 149 and 150, respectively, to an intelligent electrical power controller and monitoring system discussed in detail in U.S. Pat. No. 8,981,265, to power the bus bars 144 and 145 and the conductive coating 141.

Shown in FIG. 8 is cross sectional view of a right portion of a non-limiting embodiment of an aircraft windshield 152 of the invention. As shown in a comparison of FIGS. 7 and 8, the windshield 152 shown in FIG. 8, is similar to the windshield 110 shown in FIG. 7, except that the second glass sheet 124 of the windshield 110 of FIG. 7 is replaced by a glass sheet 159. More particularly, the second glass sheet 124 of the windshield 110 has a thickness of 0.625 Inches; is a soda-lime-silica glass known in the art as a "water white" glass, and is of the type disclosed in U.S. Pat. No. 6,962,887. U.S. Pat. No. 6,962,887 is incorporated herein by reference. The second glass sheet 159 of windshield 152 has a thickness of 0.375 inches; is a chemically strengthened HIRA or LIRA lithium glass and preferably is a LIRA lithium glass.

The improvement provided by the windshield 152 includes, but is not limited to, a windshield that that is lighter, because the second glass sheet 159 of the windshield 152 of FIG. 8 has a thickness of 0.375 inches and the second glass sheet 124 of the windshield 110 of FIG. 7 has a thickness of 0.625 inch. Thinner glass can be used because the LIRA lithium glass is chemically strengthened. Further, the LIRA lithium glass has low absorption and high transmission of visible light making the LIRA lithium glass compatible with the water white glass as they relate to light transmission. Chemical tempering the LIRA lithium glass increases its strength making the use of a thinner glass possible to reduce the weight and increase the strength of the windshield.

Shown in FIG. 9 is cross sectional view of a right portion of another non-limiting embodiment of an aircraft windshield of the invention identified by the number 162. As shown in FIGS. 8, and 9 the windshield 162 shown in FIG. 9 is similar to the windshield 152 shown in FIG. 8, except that the first glass sheet 112 of the windshield 152 of FIG. 8 is replaced by a glass sheet 164 (hereinafter also referred to as a "fourth glass sheet 164") (see FIG. 9). More particularly, the first glass sheet 112 of the windshields 110 and 152 has a thickness of 0.310 inch; is a chemically strengthened glass, and is of the type disclosed in U.S. Pat. No. 4,156,755. The LIRA and HIRA lithium glasses are chemically strengthened by replacing the lithium ions at the surfaces of the glass with sodium ions as is well known in the art. The fourth glass sheet 164 of the windshield 162 has a thickness of 0.310 inch, and is a LIRA chemically strengthened lithium glass.

The improvement provided by the windshield 162 over windshield 110 includes, but is not limited to windshields that are lighter, because the second glass sheet 159 of the windshield 152 of FIG. 8 and the second glass sheet 154 of the windshield 162 of FIG. 9 each have a thickness of 0.375 inches and the second glass sheet 124 of the windshield 110 of FIG. 7 has a thickness of 0.625 inch. Furthermore, the windshield 162 (see FIG. 9) is improved over windshield 152 (see FIG. 8) by the use of a chemically strengthened LIRA lithium glass sheet as the first glass sheet 164 of windshield 162. As discussed above the chemical strengthened LIRA lithium glass is a low-iron glass with higher visible and infrared transmittance than the HIRA lithium glass.

As can be appreciated the invention contemplates replacing the first glass sheet 112 of FIG. 7 with the glass sheet 164 of the windshield 162 and maintaining the second glass sheet 124.

As can further be appreciated, the invention is not limited to the method of shaping the glass sheets, or laminating the sheet to produce the aircraft laminated windshield. Further the invention is not limited to the manner of securing the windshield in the body of the aircraft. For example, but not limiting to the invention the HIRF film 114 is connected to an electrical power supply by a conductive tape 166, and the windshield 152 and/or 162 and hump seal 168 are secured in the body of the aircraft by plate member 170 and bolt 172.

Further, it will be readily appreciated by those skilled in the art that modifications can be made to the invention without departing from the concepts disclosed in the foregoing description. Accordingly, the particular embodiments described in detail herein are illustrative only and are not limiting to the scope of the invention, which is to be given the full breadth of the disclosure of the invention and any and all equivalents thereof.

The invention is not limited to the embodiments of the invention presented and discussed above which are presented for illustration purposes only, and the scope of the Invention is only limited by the scope of the following claims and any additional claims that are added to applications having direct or indirect linage to this application.

What is claimed is:

1. A glass composition consisting essentially of:

| Component | Range |
| --- | --- |
| $SiO_2$ | 60-63 wt % |
| $Na_2O$ | 10-12 wt % |
| $Li_2O$ | 4-5.5 wt % |
| $Al_2O_3$ | 17-19 wt % |
| $ZrO_2$ | 2-5 wt % |
| $(Al_2O_3 + ZrO_2)$ | 21.5-24 wt % |
| FeO | 0.0005-0.015 wt % |
| $Fe_2O_3$ (total iron) | 50-less than 800 ppm; | and an oxidizer selected from the group of cerium oxide in the range of greater than 0 to 0.50 wt. % and/or manganese oxide in the range of greater than 0 to 0.75 wt. %, and a redox ratio in the range of 0.005-0.15, wherein the glass within the ultraviolet ("UV") wavelength range of 295-395 nm has a transmission in the range of 50-85%; within a visible ("LTC/2°") wavelength range of 395-775 nm has a transmission in the range of range of 89-92%;

within an infrared ("IR") wavelength range of 775-2125 nm has a transmission in the range of range of 80-92%; and within a total solar energy transmittance ("TSET") wavelength range of 275-2125 nm has a transmission in the range of 82-92%, wherein the glass has a thickness of 0.223 inch (5.7 millimeters).

2. The glass composition according to claim 1, wherein cerium oxide is in the range of 0.01 to 0.15 wt. %.

3. The glass composition according to claim 1, wherein the FeO is selected from one of the ranges of 0.0005 to 0.015 wt. % and 0.001 to 0.010 wt. %, the $Fe_2O_3$ (total iron) is selected from one of the ranges of 0.005 to 0.06 wt. % and 0.005 to 0.03 wt. %, and the redox ratio is selected from one of the ranges of 0.005 to 0.15 wt. % and 0.005 to 0.10 wt. %.

4. A glass composition consisting essentially of:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. % |
| FeO | 0.0005-0.015 wt. % |
| $Fe_2O_3$ (total iron) | 800-1200 ppm; | and a redox ratio in the range of 0.006-0.13; and an oxidizer selected from the group of cerium oxide in the range of greater than 0 to 0.50 wt. % and/or manganese oxide in the range of greater than 0 to 0.75 wt. %, wherein glass within the ultraviolet ("UV") wavelength range of 295-395 nm has a transmission in the range of 67-74%; the glass within a visible ("LTC/2°") wavelength range of 395-775 nm has a transmission in the range of 88-90%: the glass within an infrared ("IR") wavelength range of 775-2125 nm has a transmission in the range of 70-79%; and the glass within a total solar energy transmittance ("TSET") wavelength range of 275-2125 nm has a transmission in the range of 78-84%, wherein the glass given above have a thickness of 0.223 inch (5.7 millimeters).

5. The glass composition according to claim 4, wherein the FeO is selected from one of the ranges of 0.002 to 0.015 wt. %; 0.002 to 0.001 wt. %; 0.0035 to 0.001 wt. % and 0.003 to 0.0038 wt. %, the $Fe_2O_3$ (total iron) is selected from one of the ranges of 0.08 to 0.12 wt. % and 0.09 to 0.10 wt. %, and the redox ratio is selected from one of the range of 0.01 to 0.13 and 0.015 to 0.10.

6. The glass composition according to claim 4, wherein the FeO is in the range of 0.002-0.012 wt. %; the total iron is in the range of 0.08-0.12 wt. %; the redox ratio is in the range of 0.02 to 0.10.

7. A device for viewing radiated infrared energy, the device comprising a housing having at least one passageway, the passageway having a first open end and a second open end, a lens system for viewing radiated infrared energy, the improvement comprising: a chemically tempered ballistic glass lens mounted adjacent to one end of the passageway, the ballistic glass lens comprising a first surface, an opposite second surface and a glass segment between the first and the second surfaces of the ballistic glass lens, the glass segment consisting essentially of:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. % |
| FeO | 0.0005-0.015 wt. % |
| $Fe_2O_3$ (total iron) | 50-less than 800 ppm; | and an oxidizer selected from the group of cerium oxide in the range of greater than 0 to 0.50 wt. % and/or manganese oxide in the range of greater than 0 to 0.75 wt. %, and a redox ratio in the range of 0.005-0.15, wherein the lens has a visible transmission of greater than 88%, an infrared transmission of greater than 80%, and an infrared viewing transmission of greater than 80%, the transmissions are for a glass lens having a thickness 0.223 inch (5.7 millimeter).

8. The device according to claim 7, wherein the FeO of the glass segment is in the range of 0.001-0.010 wt. %.

9. The device according to claim 8, wherein the redox ratio of the glass segment is in the range of 0.005 to 0.10.

10. A glass composition consisting essentially of:

| Component | Range |
| --- | --- |
| $SiO_2$ | 60-63 wt % |
| $Na_2O$ | 10-12 wt % |
| $Li_2O$ | 4-5.5 wt % |
| $Al_2O_3$ | 17-19 wt % |
| $ZrO_2$ | 2-5 wt % |
| $(Al_2O_3 + ZrO_2)$ | 21.5-24 wt % |
| FeO | 0.02-0.05 wt % |
| $Fe_2O_3$ (total iron) | 800-1200 ppm | and a redox ratio of 0.20-0.40, wherein the glass within the ultraviolet ("UV") wavelength range of 295-395 nm has a transmission in the range of 50-85%; the glass within a visible ("LTC/2°") wavelength range of 395-775 nm has a transmission in the range of 89-92%: the glass within an infrared (IR) wavelength range of 775-2125 nm has a transmission in the range of 80-90%; and the glass within a total solar energy transmittance ("TSET") wavelength range of 275-2125 nm has a transmission in the range of 82-92%, wherein the glass given above have a thickness of 0.223 inch (5.7 millimeters).

11. The glass composition according to claim 10, wherein the FeO is in the range of 0.020-0.035 wt. %; the total iron is in the range of 0.05-0.12 wt %; and a redox ratio in the range of 0.2 to 0.35.

12. The glass composition according to claim 10, wherein the FeO is selected from one of the ranges of 0.02 to 0.035 wt. %; 0.035 to 0.4 wt. %; and 0.03 to 0.038 wt. %, and the $Fe_2O_3$ (total iron) is selected from one of the ranges of 0.05 to 0.12 wt. % and 0.06 to 0.10 wt. %, and the redox ratio is 0.20 to 0.35.

13. A laminated transparency comprising a plurality of chemically strengthened glass sheets and optionally plastic sheets laminated together by plastic interlayers, wherein at least one of the glass sheets has a glass composition consisting essentially of:

| Component | Range |
| --- | --- |
| $SiO_2$ | 60-63 wt. % |
| $Na_2O$ | 10-12 wt. % |
| $Li_2O$ | 4-5.5 wt. % |
| $Al_2O_3$ | 17-19 wt. % |
| $ZrO_2$ | 3.5-5 wt. % |
| $(Al_2O_3 + ZrO_2)$ | 21.5-24 wt. % | and a selection from one of Group A and B, Group A consisting essentially of:

| | |
| --- | --- |
| FeO | 0.0005-0.015 wt. % |
| $Fe_2O_3$ (total iron) | 50-less than 800 ppm | and an oxidizer consisting essentially of cerium oxide in the range of greater than 0 to 0.50 wt. % and/or manganese oxide in the range of greater than 0 to 0.75 wt. %, and a redox ratio in the range of 0.0005-0.15, such that the glass within the ultraviolet ("UV") wavelength range of 295-395 nm has a transmission in the range of 50-85%; within a visible ("LTC/2°") wavelength range of 395-775 nm has a transmission in the range of range of 89-92%; within an infrared ("IR") wavelength range of 775-2125 nm has a transmission in the range of range of 80-92%; and within a total solar energy transmittance ("TSET") wavelength range of 275-2125 nm has a transmission in the range of 82-92%, wherein the glass has a thickness of 0.223 inch (5.7 millimeters);

and Group B consisting essentially of:

| | |
| --- | --- |
| FeO | 0.02-0.05 wt. % |
| $Fe_2O_3$ (total iron) | 800-1200 ppm; |
| a redox ratio | 0.20-0.40 | such that the glass within the ultraviolet ("UV") wavelength range of 295-395 nm has a transmission in the range of 50-85%; the glass within a visible ("LTC/2°") wavelength range of 395-775 nm has a transmission in the range of 89-92%: the glass within an infrared (IR) wavelength range of 775-2125 nm has a transmission in the range of 80-90%; and the glass within a total solar energy transmittance ("TSET") wavelength range of 275-2125 nm has a transmission in the range of 82-92%, wherein the glass given above has a thickness of 0.223 inch (5.7 millimeters).

14. The laminated transparency according to claim 13, wherein the laminated transparency is selected from the group of aircraft windows, and land, air, space, on the water, and below the water vehicle windows.

15. The laminated transparency according to claim 14, wherein the window is a windshield.

\* \* \* \* \*